US012798979B2

(12) United States Patent
Stein et al.

(10) Patent No.: US 12,798,979 B2
(45) Date of Patent: Nov. 17, 2026

(54) CONVERSION OF ORGANIC MATERIAL TO NANOCARBON STRUCTURES VIA MICROWAVE PLASMA PYROLYSIS

(71) Applicant: Board of Regents, The University of Texas System, Austin, TX (US)

(72) Inventors: Benjamin Stein, Dallas, TX (US); Orlando Auciello, Garland, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 287 days.

(21) Appl. No.: 18/589,842

(22) Filed: Feb. 28, 2024

(65) Prior Publication Data

US 2024/0287711 A1 Aug. 29, 2024

Related U.S. Application Data

(60) Provisional application No. 63/487,455, filed on Feb. 28, 2023.

(51) Int. Cl.

| | |
|---|---|
| ***C01B 32/26*** | (2017.01) |
| ***C01B 32/28*** | (2017.01) |
| ***D01F 9/16*** | (2006.01) |
| ***D01F 9/17*** | (2006.01) |
| ***D01F 9/24*** | (2006.01) |
| ***D06M 11/58*** | (2006.01) |
| ***D06M 11/81*** | (2006.01) |

(Continued)

(52) U.S. Cl.
CPC .............. *C01B 32/26* (2017.08); *C01B 32/28* (2017.08); *D01F 9/16* (2013.01); *D01F 9/17* (2013.01); *D01F 9/24* (2013.01); *D06M 11/58* (2013.01); *D06M 11/81* (2013.01); *H01M 4/133* (2013.01); *H01M 4/587* (2013.01); *H01M 10/0525* (2013.01); *A01G 18/20* (2018.02); *C01P 2002/54* (2013.01); *C01P 2002/60* (2013.01); *C01P 2006/40* (2013.01); *D06M 2101/40* (2013.01); *D10B 2101/122* (2013.01); *D10B 2501/042* (2013.01); *D10B 2505/00* (2013.01)

(58) Field of Classification Search
CPC ...................................................... C01B 32/26
See application file for complete search history.

(56) References Cited

U.S. PATENT DOCUMENTS 5,087,434 A * 2/1992 Frenklach .............. C01B 32/26 423/446
9,754,733 B2 9/2017 Fan et al.

(Continued)

OTHER PUBLICATIONS

Naseri, et al., "Porous electrospun nanocomposite mats based on chitosan-cellulose nanocrystals for wound dressing: effect of surface characteristics of nanocrystals.", Cellulose (2015), 22, 521-534.

(Continued)

*Primary Examiner* — Andrew T Piziali
(74) *Attorney, Agent, or Firm* — Yee & Associates, P.C.

(57) ABSTRACT

The present disclosure teaches a method of processing chitin, including providing a source of chitin; and pyrolyzing at least a portion of the source of chitin using a microwave plasma. Pyrolyzing includes producing a nanostructured carbon material including at least one of diamond, ultrananocrystalline diamond (UNCD), graphite, and graphene. Compositions of matter and articles of manufacture are also disclosed.

14 Claims, 22 Drawing Sheets

(51) Int. Cl.

| | |
|---|---|
| ***H01M 4/133*** | (2010.01) |
| ***H01M 4/587*** | (2010.01) |
| ***H01M 10/0525*** | (2010.01) |
| *A01G 18/20* | (2018.01) |
| *D06M 101/40* | (2006.01) |

(56) References Cited

U.S. PATENT DOCUMENTS

| | | | | |
|---|---|---|---|---|
| 2005/0042161 A1* | 2/2005 | Carlisle | C23C 16/274 977/840 |
| 2012/0199792 A1* | 8/2012 | Cherkasky | B01J 3/065 501/86 |
| 2014/0134092 A1* | 5/2014 | Shankman | B82Y 30/00 423/448 |
| 2015/0068113 A1 | 3/2015 | Conner et al. | |

OTHER PUBLICATIONS

Nawawi, et al., "Nanomaterials Derived from Fungal Sources: Is It the New Hype?", Biomacromolecules (2020), 21, 30-55.

Niosh, et al., "Assessment of filter penetration performance and fit for decontamionated N95 Respiratorsn.", CDC (2020).

Pimenta, et al., "Hard, transparent, sp3-containing 2D phase formed from few-layer graphene under compression.", Carbon N. Y. (2021), 173, 744-757.

Sanandiya et al., "Circular manufacturing of chitinous biocomposites via bioconversion of urban refuse", Sci. Rep. (2020), 10, 1-8.

Shenderova, et al., "Molecular Simulation Bonding and Stability of Hybrid Diamond/ Nanotube Structures Bonding and Stability of Hybrid Diamond/Nanotube Structures.", (2010).

Showei, et al., "Martian biolith: A bioinspired regolith composite for closed-loop extraterrestrial manufacturing," (2020).

Skoog, et al., "Biological evaluation of ultrananocrystalline and nanocrystalline diamond coatings." J. Mater. Sci. Mater. Med. (2016), 27, 187.

Stephan, et al., "Pyrolitic carbon from biomass precursors as anode materials for lithium batteries.", Mater. Sci. Eng. (2006), A 430, 132-137.

Suzuki, et al., "Graphite-shell-chains selectively and efficiently produced from biomass rich in cellulose and chitin.", Sci. Rep. (2020), 10, 1-7.

Tang, et al., "Biomass gasification using capacitively coupled RF plasma technology.", Fuel 84 (2005), 2055-2063.

Tang, et al., "Plasma Pyrolysis of Biomass for Production of Syngas and Carbon Adsorbent.", Energy & Fuels (2005), 19, 1174-1178.

Tang, et al., "Wild Fungus Derived Carbon Fibers and Hybrids as Anodes for Lithium-Ion Batteries.", ACS Sustain. Chem. Eng. (2016), 4, 2624-2631.

Tatarova, et al., "Plasmas for environmental issues: From hydrogen production to 2D materials assembly." Plasma Sources Science and Technology (2014), 23.

Titova, et al., "The influence of plasma-solution treatment on the properties of hemp fiber ligning," Surf. Eng. Appl. Electrochem. (2010), 46, 127-130.

Tzeng, et al., "Nanocrystalline-diamond/carbon and nanocrystalline-diamond/silicon composite electrodes for Li-based batteries.", U.S. Pat. No. 9,196,905 (2015).

Um, et al., "From grass to battery anode: Agricultural biomass hemp-derived carbon for lithium storage.", RSC Adv. (2018), 8, 32231-32240.

Van De Velde, et al., "Biopolymers: overview of several properties and consequences on their applications," Polym. Test. (2002), 21, 433-442.

Vanneste, et al., "Unconventional Pretreatment of Lignocellulose with Low-Temperature Plasma.", ChemSusChem (2017), 10, 14-31.

Vasillieva, et al., "Chitin and Cellulose Processing in Low-Temperature Electron Beam Plasma." Molecules (2017), 22, 1908.

Veres, et al., "Raman spectroscopy of UNCD grain boundaries. Nanostructured Mater. Adv. Technol." Appl. (2009), 115-121.

Vukcevic, et al., "Application of carbonized hemp fibers as a new solid-phase extraction sorbent for analysis of pesticides in water samples.", Chem. Eng. J. (2012), 211-212, 224-232.

Wosten, et al., "Filamentous fungi for the production of enzymes, chemicals and materials," Curr. Opin. Biotechnol. (2019), 59, 65-70.

Wu, et al., "From biomass chitin to mesoporous nanosheets assembled loofa sponge-like N-doped carbon/g-C3N4 3D network architectures as ultralow-cost bifunctional oxygen catalysts.", Microporous Mesoporous Mater. (2017), 240, 216-226.

Xie, et al., "Mechanism for direct graphite-to-diamond phase transition. ", (2014).

Yuan, et al., "Nitrogen-doped carbon sheets derived from chitin as non-metal bifunctional electrocatalysts for oxygen reduction and evolution.", RSC Adv. (2015), 5, 56121-56129.

Zhang, et al., "Manganese Monoxide/Biomass-Inherited Porous Carbon Nanostructure Composite Based on the High Water-Absorbent Agaric for Asymmetric Supercapacitor.", ACS Sustain. Chem. Eng. (2019).

Zhao, et al., "Biomass Pyrolysis in an Argon/Hydrogen Plasma Reactor." Eng. Life Sci. (2001), 1, 197.

Zhu et al., "Wood-Derived Materials for Green Electronics, Biological Devices, and Energy Applications", Chemical Reviews (2016), doi:10.1021/acs.chemrev.6b00225.

Zimniewska, et al., "Their Structure and Properties Suitable for Composite Applications", in Cellulose Fibers: Bio- and Nano-Polymer Composites, Springer Berlin Heidelberg (2011), 97-119.

"Advanced Diamond Technologies.", Available at: http://www.thindiamond.com/, Accessed (2021).

"Ecovative Design", Available at: http://ecovativedesign.com/, Accessed (2020).

"Method of Producing a Chitinous Polymer Derived from Fungal Mycelium." (2012).

"The 'Living Cocoon' Is an Eco-Friendly Coffin Made With Fungi. ", Available at: https://www.treehugger.com/living-cocoon-eco-friendly-coffin-made-with-fungi-5097275, Accessed (2021).

Antinori, et al., "Fine-Tuning of Physicochemical Properties and Growth Dynamics of Mycelium-Based Materials.", ACS Appl. Bio Mater. (2020), 3, 1044-1051.

Appels et al., "Fabrication factors influencing mechanical, moisture- and water-related properties of mycelium-based composites", Mater. Des. (2019), 161, 64-71.

Auciello, et al., "Review on advances in microcrystalline, nanocrystalline and ultrananocrystalline diamond films-based micro/nano-electromechanical systems technologies." Journal of Materials Science (2021), 56, 7171-7230.

Auciello, et al., "Status review of the science and technology of ultrananocrystalline diamond (UNCDTM) films and application to multifunctional devices." Diamond and Related Materials (2010), 19, 699-718.

Babu, et al., "Biomass pyrolysis: A state-of-the-art review." Biofuels, Bioproducts and Biorefining (2008) 2, 393-414.

Birrell, et al., "Interpretation of the Raman spectra of ultrananocrystalline diamond.", Diam. Relat. Mater. (2005), 14, 86-92.

Boric, et al., "An intensified atmospheric plasma-based process for the isolation of the chitin biopolymer from waste crustacean biomass." Green Chem. (2018), 20, 1199-1204.

Bustillos, et al., "Uncovering the Mechanical, Thermal, and Chemical Characteristics of Biodegradable Mushroom Leather with Intrinsic Antifungal and Antibacterial Properties." ACS Appl. Bio Mater. (2020), 3, 3145-3156.

Campbell, et al., "Bio-Derived, Binderless, Hierarchically Porous Carbon Anodes for Li-ion Batteries.", Sci. Rep. (2015), 5.

Carlisle, et al., arlisle, Method to grow carbon thin films consisting entirely of diamond grains 3-5 nm in size and high-energy grain boundaries. (2005).

Carvalho, et al., "Simultaneous CVD synthesis of graphene-diamond hybrid films.", Carbon N. Y. (2016), 98, 99-105.

Cellini, et al., "Layer dependence of graphene-diamene phase transition in epitaxial and exfoliated few-layer graphene using machine learning.", 2D Mater. (2019), 6.

(56) References Cited

OTHER PUBLICATIONS

Chen, et al., "Chitin-derived porous carbon loaded with Co, N and S with enhanced performance towards electrocatalytic oxygen reduction, oxygen evolution, and hydrogen evolution reactions.", Electrochim. Acta (2019), 304, 350-359.
Cheng, et al., "Electrically conductive ultrananocrystalline diamond-coated natural graphite-copper anode for New long-life lithium-ion battery.". Advanced Materials (2014), 26 (1-5) 3724-3729.
Chernozatonskil, et al., "Fully Hydrogenated and Fluorinated Bigraphenes—Diamanes: Theoretical and Experimental Studies.", C 7 (2021), 17.
Dadachova, et al., "Ionizing radiation: how fungi cope, adapt, and exploit with the help of melanin," Current Opinion in Microbiology (2008), 11 525-531.
Duan, et al., "Recent advances in chitin based materials constructed via physical methods.", Progress in Polymer Science, Elsevier Ltd (2018), 82, 1-33.
Eldy, et al., "Demo: From Plastic to Biomaterials: Prototyping DIY Electronics with Mycelium", (2019).
Elieh-Ali-Komi, et al., "Chitin and Chitosan: Production and Application of Versatile Biomedical Nanomaterials", Int. J. Adv. Res. (2016), 4, 411-427.
Elsacker, et al., "Mechanical, physical and chemical characterisation of mycelium-based composites with different types of lignocellulosic substrates.", PLoS One (2019).
Erohin, et al., "Nano-Thermodynamics of Chemically Induced Graphene-Diamond Transformation." Small (2020), 16.
Fazil, et al., "Chitin nanopaper from mushroom extract: natural composite of nanofibers and glucan from a single biobased source.", ACS Sustain. Chem. Eng. (2019), 7, 6492-6496.
Gao, et al., "Ultrahard carbon film from epitaxial two-layer graphene. Nat. Nanotechnol.", (2018), 13, 133-138.
Garcia, et al., "Bacterial cellulose as a potential bioleather substitute for the footwear industry," (2019), 12, 582-585.
Gaudino, et al., "From waste biomass to chemicals and energy via microwave-assisted processes." Green Chem. (2019), 21, 1202-1235.
Geng, et al., "How to globalize the circular economy.", Nature (2019), 565, 153-155.
Gruen, et al., "N-Type doping of NCD films with nitrogen and electrodes made there from.", U.S. Pat. No. 6,793,849 B1 (2004).
Gunther, et al., "Carbon sequestration for everybody : decrease atmospheric carbon dioxide, earn money and improve the soil.", Energy Environ. (2007), 1-21.
Haneef, et al., "Advanced Materials from Fungal Mycelium: Fabrication and Tuning of Physical Properties.", Sci. Rep. (2017), 7, 1-11.
Hu, et al., "High mobility n-type conductive ultrananocrystalline diamond and graphene nanoribbon hybridized carbon films." Carbon N. Y. (2016), 98, 671-680.
Hu, et al., "The roles of hydrogen in the diamond/amorphous carbon phase transitions of oxygen ion implanted ultrananocrystalline diamond films at different annealing temperatures.", AIP Adv. (2012), 2.
Huang, et al., "Treatment of organic waste using thermal plasma pyrolysis technology.", Energy Convers. Manag. (2007), 48, 1331-1337.
Jiang, et al., "Manufacturing of biocomposite sandwich structures using mycelium-bound cores and preforms.", J. Manuf. Process (2017), 28, 50-59.
Jones, et al., "Engineered mycelium composite construction materials from fungal biorefineries: A critical review.", Materials and Design (2020), 187, 108397.
Jones, et al., "Leather-like material biofabrication using fungi.", Nature Sustainability, Nature Research (2020), 1-8.
Jones, et al., "Thermal Degradation and Fire Properties of Fungal Mycelium and Mycelium—Biomass Composite Materials.", (2018), 8, 17583.
Jones, et al., "Waste-Derived Low-Cost Mycelium Nanopapers with Tunable Mechanical and Surface Properties.", Biomacromolecules (2019), 20, 3513-3523.
Kashyap, et al., "Myconanotechnology in agriculture: A perspective. ", World Journal of Microbiology and Biotechnology (2013), 29, 191-207.
Khongkrapan, et al., "Fuel gas and char from pyrolysis of waste paper in a microwave plasma reactor.", International Journal of Energy and Environment 4 (Online, 2013).
Kuramae, et al., "An ultrastrong nanofibrillar biomaterial: The strength of single cellulose nanofibrils revealed via sonication-induced fragmentation.", Biomacromolecules (2013), 14, 248-253 (2013).
Lam, et al., "Microwave Pyrolysis with Steam Activation in Producing Activated Carbon for Removal of Herbicides in Agricultural Surface Water.", Ind. Eng. Chem. Res. (2019), 58, 695-703.
Lam, et al., "Multi-scale microstructure investigation for a PM2.5 air-filter dfficiency study of non-woven polypropylene," Quantum Beam Sci. (2019), 3, 20.
Law, et al., "Converting a Microwave Oven into a Plasma Reactor: A Review.", International Journal of Chemical Engineering (2018).
Mcgillivray, et al., "Applied electrical fields polarize the growth of mycelial fungi.", J. Gen. Microbiol. (1986), 132, 2515-2525.
Morganti, et al., "Use of chitin nanofibrils from biomass for an innovative bioeconomy.", (2016).

* cited by examiner

610

| EXPERIMENTAL d (nm) | REPORTED d (nm) | hkl |
|---|---|---|
| 0.28 | 0.2522 | 110 |
| 0.221 | 0.2059 | 111 |

CONVERSION OF ORGANIC MATERIAL TO NANOCARBON STRUCTURES VIA MICROWAVE PLASMA PYROLYSIS

CROSS-REFERENCE TO RELATED APPLICATION

Referring to the application data sheet filed herewith, this application claims a benefit of priority under 35 U.S.C. 119(e) from provisional patent application U.S. Ser. No. 63/487,455, filed Feb. 28, 2023, the entire contents of which are hereby expressly incorporated herein by reference for all purposes.

GOVERNMENT SUPPORT

This invention was made with government support under Grant no. W911NF-20-2-0010 awarded by the Army Research Office. The government has certain rights in the invention.

BACKGROUND

Innovative uses for biomass have gained considerable scientific research interest in recent years, as part of a necessary global imperative to create a more sustainable “circular economy” based around renewable resources. Fungal mycelium has been a popular focus of this research due in part to its excellent material performance characteristics, versatility, and prevalence in the natural world. Chitin, the biomolecule comprising the cellular walls of the mycelium, along with lignin and cellulose, are part of a growing library of ecologically sustainable biomolecules with the potential to replace the non-biodegradable materials currently in common use today filling up landfills and waterways.

More recent efforts in chitin-based research have demonstrated applications such as nanoporous-scaffolds for biological cell cultivation, wound dressings, electrical circuit boards, and biosensors. Commercial applications utilizing mycelia, such as alternative packaging material currently sold by Ecovative, and substitute leather offered by Bolt Threads are currently being tested in the marketplace. Similar emerging applications of mycelium as a binder in composites have shown potential as biodegradable construction materials, compostable coffins, and fire-retardant liners for homes and offices.

Heretofore, the requirement(s) of creating a more sustainable “circular economy” based around renewable resources reducing the cost and energy consumption and replacing non-biodegradable materials referred to above have not been fully met. In view of the foregoing, there is a need in the art for a solution that simultaneously solves all of these problems.

SUMMARY

There is a need for the following embodiments of the present disclosure. Of course, the present disclosure is not limited to these embodiments.

Embodiments of this disclosure relate to methods of transforming chitin into diamond, ultrananocrystalline diamond, graphite and/or graphene using microwave plasma pyrolysis (MPP), and to compositions of matter and articles of manufacture composed thereof.

According to an embodiment of the present disclosure, a method of processing biomaterial comprises: providing a source of chitin; and pyrolyzing at least a portion of the source of chitin using a microwave plasma, wherein pyrolyzing comprises producing a nanostructured carbon material comprising at least one of diamond, ultrananocrystalline diamond, graphite, and graphene.

According to another embodiment of the present disclosure, an article of manufacture comprises: a nanostructured carbon material body comprising a network of fibers, the network of fibers being arranged in a branching root configuration, wherein the network of fibers are comprised of at least 90% by weight of nanocarbons comprised of diamond, ultrananocrystalline diamond, graphite, graphene, and combinations thereof.

According to another embodiment of the present disclosure, a composition of matter comprises: a nanostructured carbon material comprising a network of fibers, the network of fibers being arranged in a branching root configuration, wherein the network of fibers are comprised of at least 90% by weight of nanocarbons comprised of diamond, ultrananocrystalline diamond, graphite, graphene, and combinations thereof.

These, and other, embodiments of the present disclosure will be better appreciated and understood when considered in conjunction with the following description and the accompanying drawings. It should be understood, however, that the following description, while indicating various embodiments of the present disclosure and numerous specific details thereof, is given for the purpose of illustration and does not imply limitation. Many substitutions, modifications, additions and/or rearrangements may be made within the scope of embodiments of the present disclosure, and embodiments of the present disclosure include all such substitutions, modifications, additions and/or rearrangements.

BRIEF DESCRIPTION OF THE DRAWINGS

The novel features believed to be characteristic of the illustrative embodiments are set forth below. The illustrative embodiments, however, and further objectives and features thereof, will best be understood by reference to the following detailed description when read in conjunction with the accompanying drawings, wherein.

DETAILED DESCRIPTION

Figure 1A:
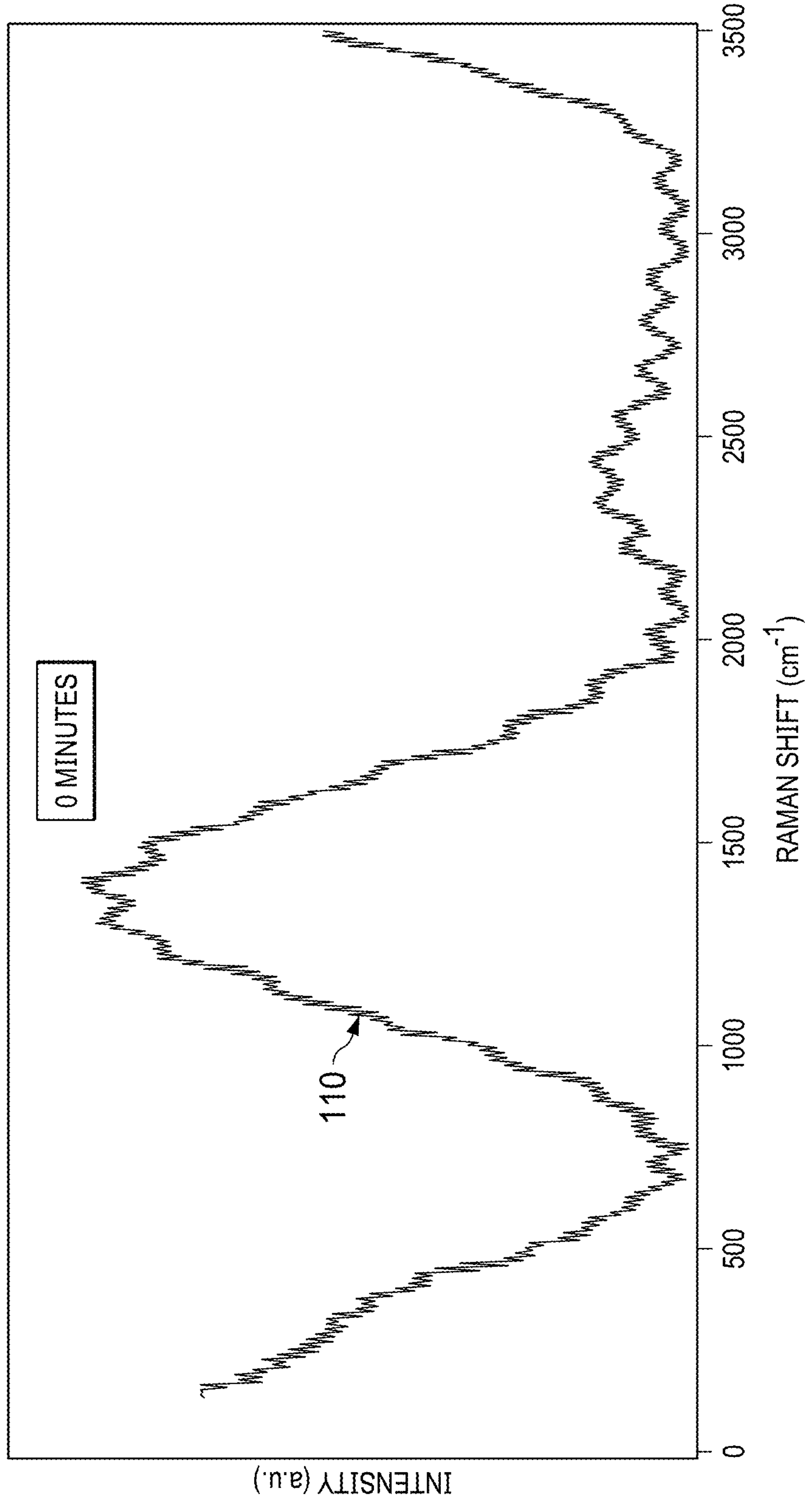
FIGS. 1*a*-1*f* are a time elapsed series of graphs showing Raman characterization of mycelium during MPP (microwave plasma pyrolysis) taken at 1-minute intervals, with time elapsed shown in each inset.
Figure 1B:
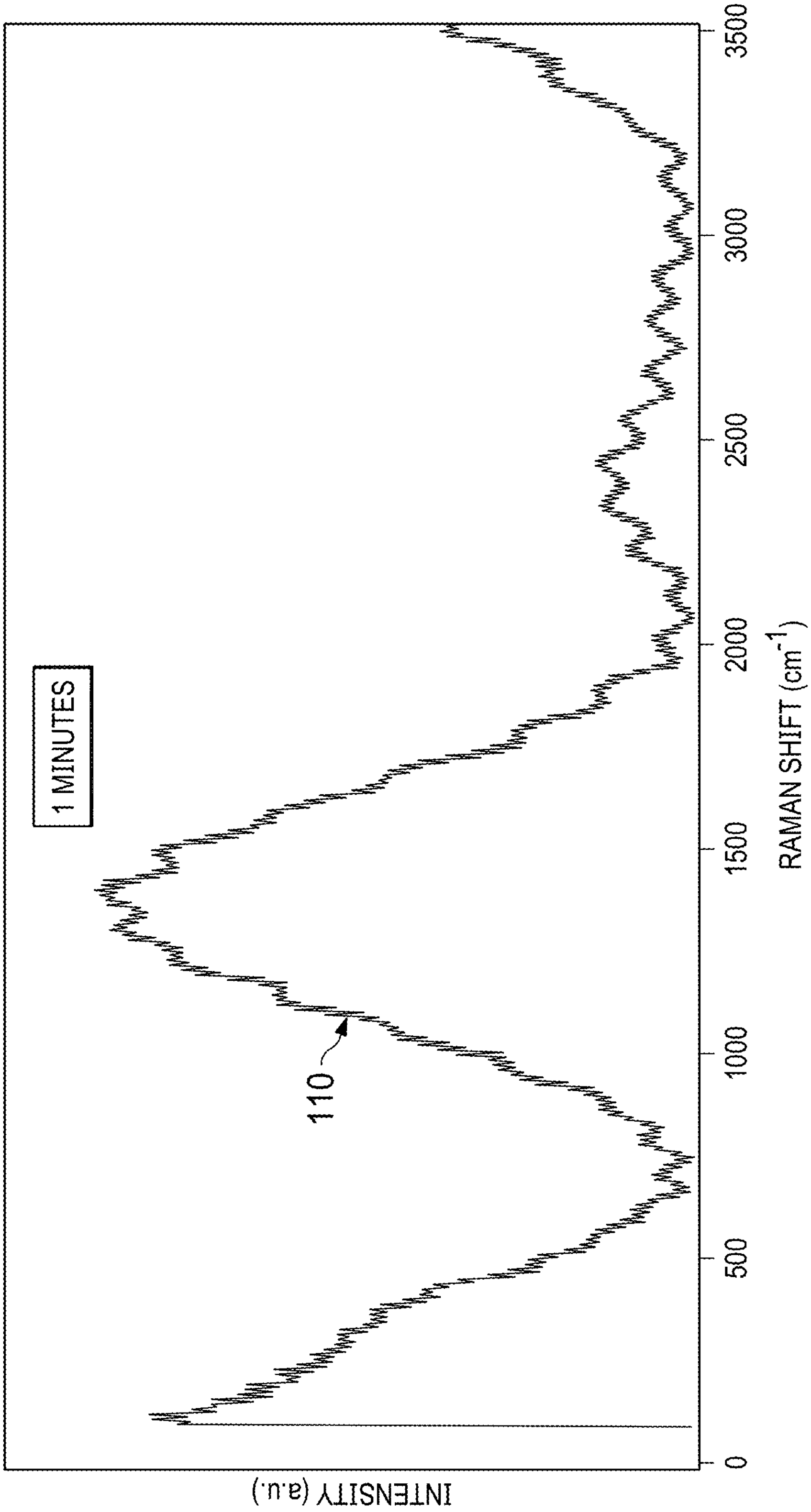
Figure 1C:
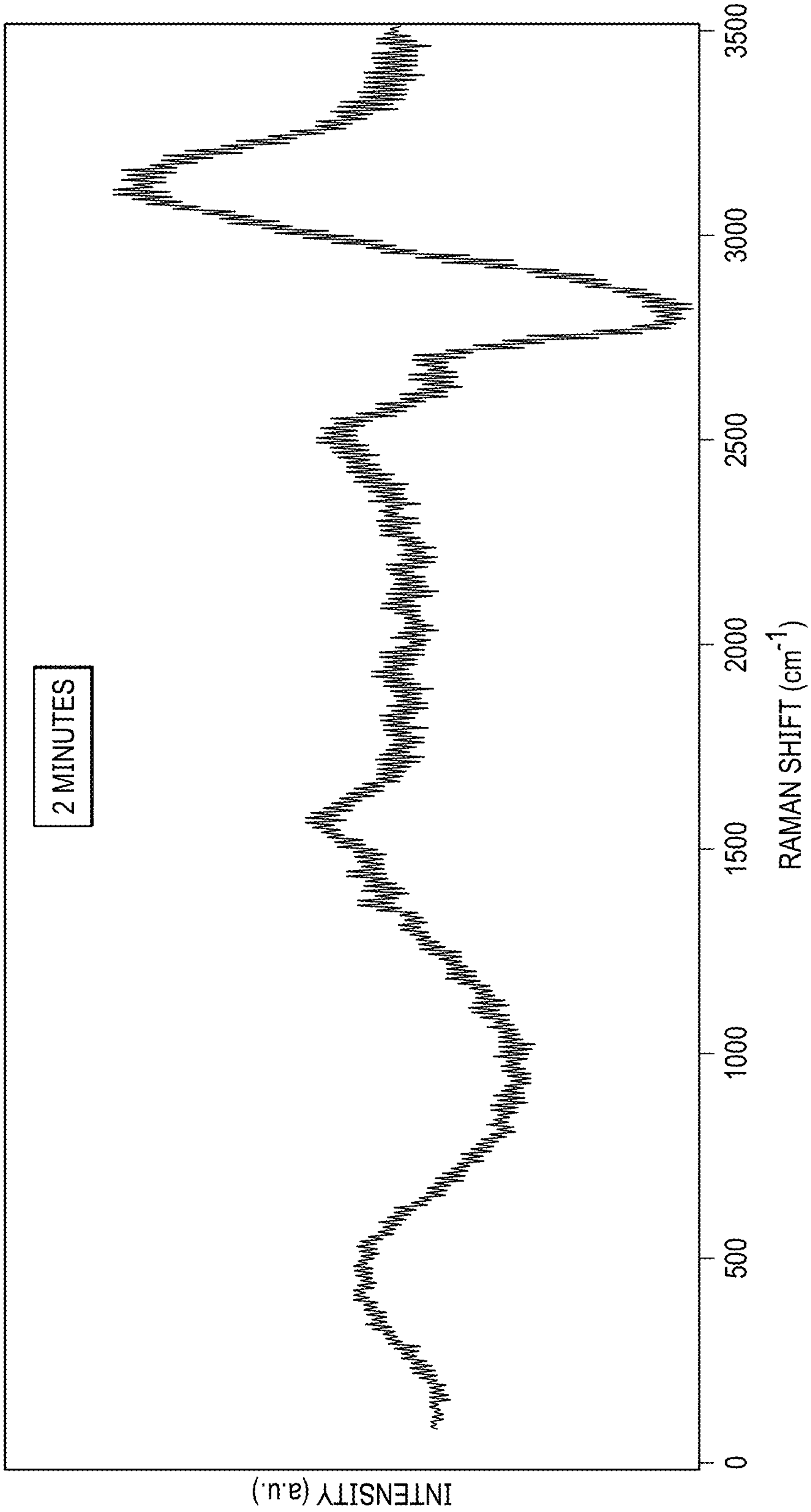
Figure 1D:
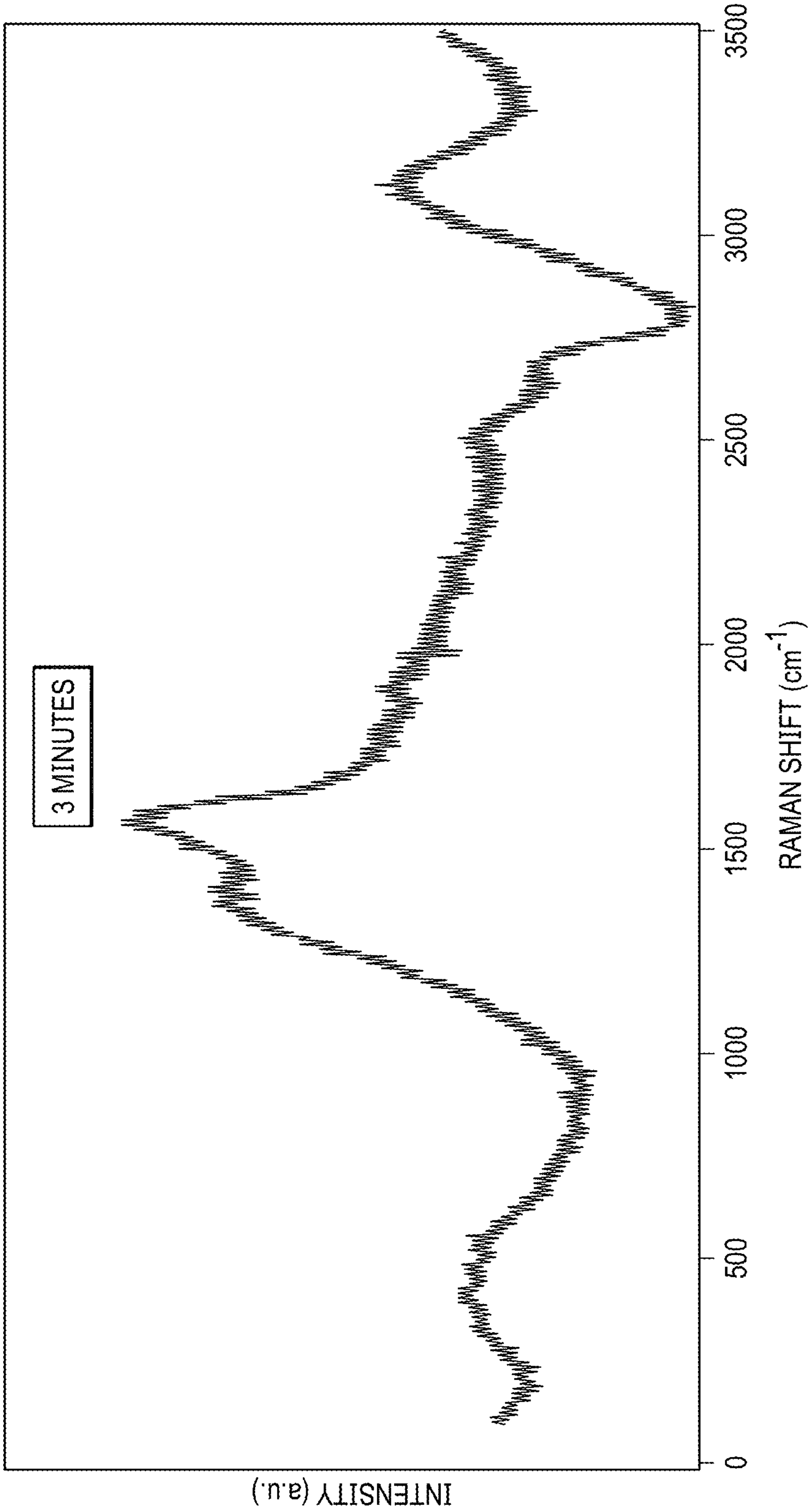
Figure 1E:
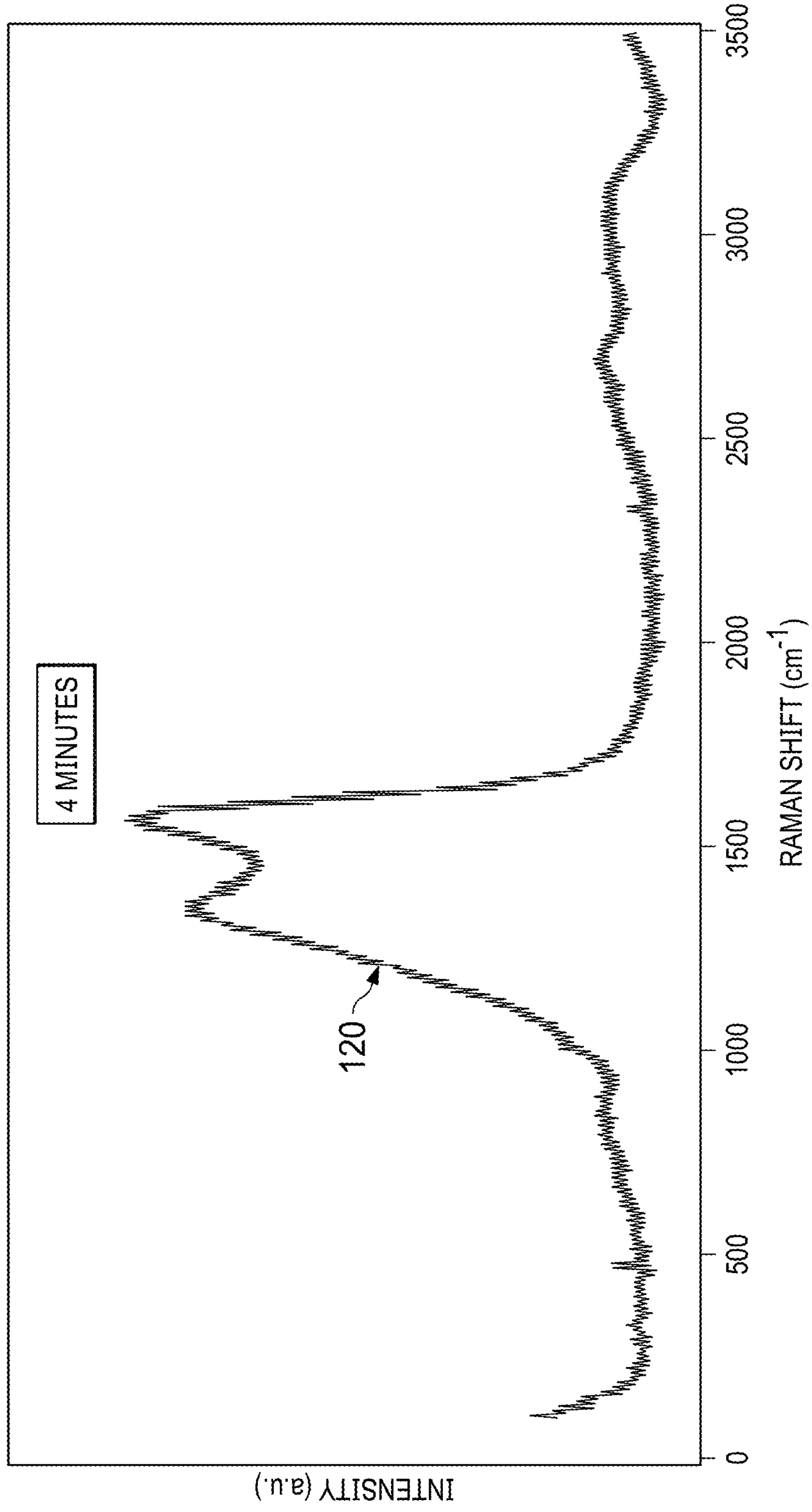
Figure 1F:
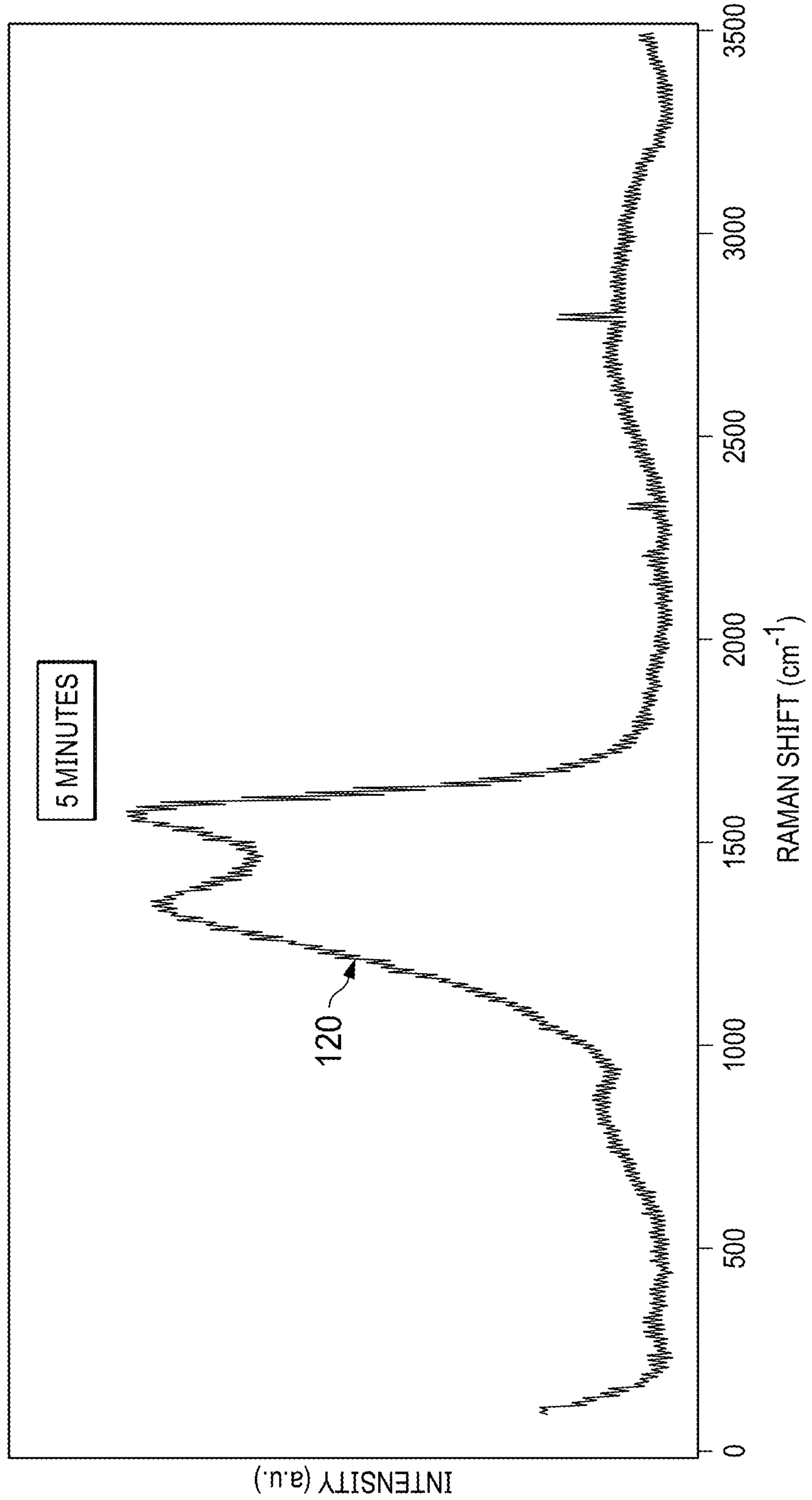

Embodiments presented in the present disclosure and the various features and advantageous details thereof are explained more fully with reference to the nonlimiting embodiments that are illustrated in the accompanying drawings and detailed in the following description. Descriptions of well known materials, techniques, components and equipment are omitted so as not to unnecessarily obscure the embodiments of the present disclosure in detail. It should be understood, however, that the detailed description and the specific examples are given by way of illustration only and not by way of limitation. Various substitutions, modifications, additions and/or rearrangements within the scope of the underlying inventive concept will become apparent to those skilled in the art from this disclosure.

The disclosure of this application is technically related to co-pending U.S. Ser. No. 18/590,318, filed Feb. 28, 2024, the entire contents of which are hereby expressly incorporated by reference for all purposes.

Fungal mycelium has been touted as an environmentally sustainable potential replacement for a wide range of materials commonly used today, including textiles, building materials and medical bandages. Further modification of mycelium is possible through pyrolysis, wherein the chitin in the mycelium is carbonized to produce useful carbon allotropes like biochar or activated carbon.

The unique nature and potential applications of diamond in different forms (e.g. bulk, thin films), in particular ultrananocrystalline diamond as a thin film or coating, have received a great deal of scientific and commercial interest over the past decades, including industrial applications (mechanical pump seals and bearings) with emerging applications such as quantum sensors, AFM tips, NEMS/MEMS devices, and biomedical coatings amplifying this trend. However, despite the superior properties of diamond and diamond systems, it has yet to achieve full adoption across technology sectors as the material of choice for modern applications due in part to the difficulty of growing and manipulating it at industrial scales. The findings reported here were discovered by accident and are not claimed to be a breakthrough that will finally bring conventional diamond technologies to the broader marketplace. Instead, these results should be taken as part of an emerging alternative manufacturing methodology taking advantage of the potential of natural systems to efficiently produce nanomaterials and nanostructures with useful attributes capable of replacing existing non-renewable technologies or creating entirely new ones.

Here we report that this pyrolysis process can be achieved quickly and efficiently with a plasma-reactor built around a commonly available kitchen microwave oven. It is reported here that this microwave plasma pyrolysis (MPP) process converts the mycelium into a "myco-diamond" matrix containing ultrananocrystalline diamond (UNCD) nanostructures with macro, micro, and nanoscale features. Verification of the MPP-induced transformation of mycelium into UNCD is confirmed via complementary techniques including Raman spectroscopy, High Resolution Transmission Electron Microscopy (HRTEM) and X-Ray Diffraction (XRD). Analysis of the myco-diamond surface morphology was performed via Scanning Electron Microscopy (SEM). This research development represents a scalable and low-cost method of producing UNCD nanomaterials derived from renewable biological sources.

Experimental Results:

Characterization of Microwave Plasma Pyrolyzed Mycelium

Referring to FIGS. 1*a*-1*f*, a time elapsed series of graphs show Raman characterization of mycelium during MPP (microwave plasma pyrolysis) taken at 1-minute intervals, with time elapsed shown in each inset. Transformation of chitinous biochemical bonds to carbon $sp^2/sp^3$ bonds becomes apparent after 1 minute of processing and can be considered finished after 4 minutes, remaining stable beyond 5 minutes. Samples processed for 10, 15, and 20 minutes showed comparable spectra to the 5-minute sample.

Raman spectra measurements were taken at 1-minute intervals during the plasma pyrolysis process for a set of identical samples to observe the evolution of the chitin to myco-diamond transformation. As shown in FIGS. 1*a*-1*f*, the time-lapse indicates that conversion from chitin Raman spectra 110 to UNCD Raman spectra 120 becomes apparent after 3 minutes of pyrolysis, with the emergence of the characteristic UNCD Raman peaks and stabilizes after 5 minutes. Samples exposed up to 20 minutes showed no further change in spectra.

Raman spectra of plasma pyrolyzed mycelium are identical to spectra of UNCD thin films as reported in the literature. Average weight loss of samples after pyrolysis were found to be on average 80-90%, in agreement with previous studies on the pyrolysis of mycelium performed using thermogravimetric analysis (TGA), although difficulties with measurement accuracy arose due to sample embrittlement and breakage.

Figure 2:
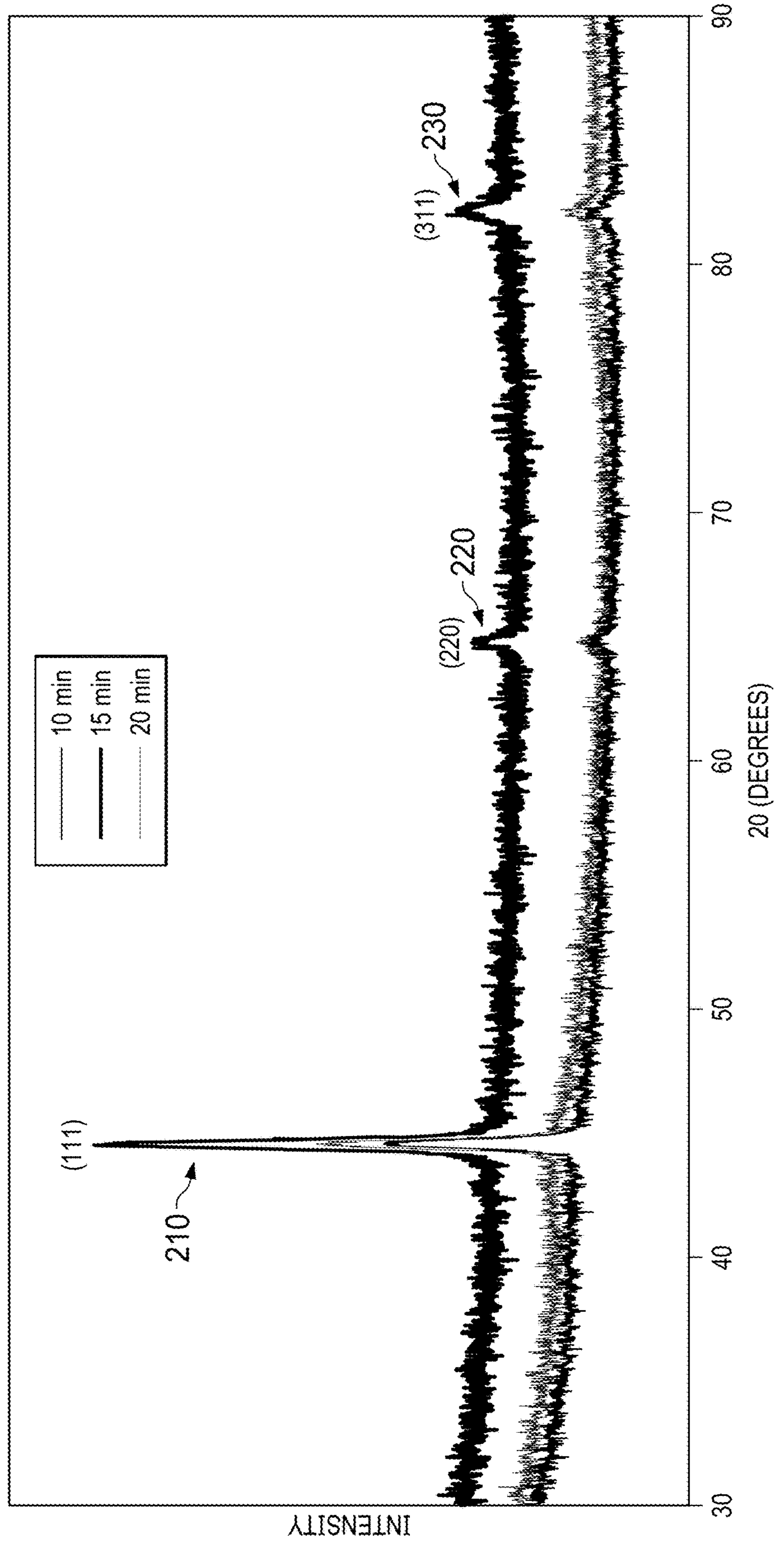
FIG. 2 is a graph of XRD (X-ray diffraction) scans of myco-diamond samples processed for 10, 15, and 20 minutes showing characteristic diamond peaks along the (111), (220), and (311) lattice orientations.

Referring to FIG. 2, XRD analysis of myco-diamond samples exposed for 10, 15, and 20 minutes provide spectrum revealing peak 210, peak 220, and peak 230 correlated with diamond (111), (220), and (311) lattices further confirming the presence of UNCD.

Figure 3A:
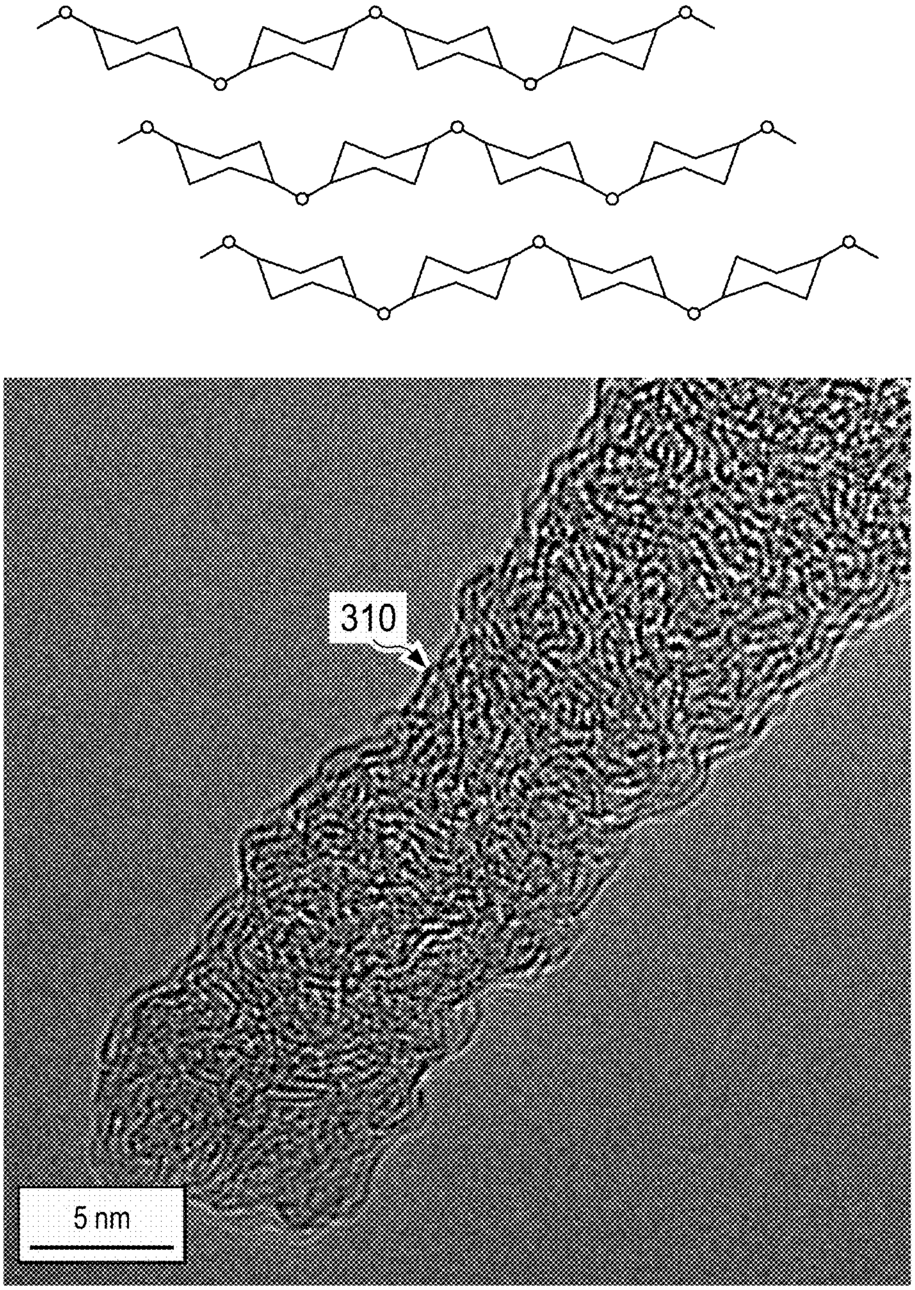
FIGS. 3*a*-3*d* are a series of TEM (transmitting electron microscopy) images with accompanying depictions of the relevant carbon structures present during each stage of the proposed mechanism for UNCD (ultrananocrystalline diamond) formation during plasma pyrolysis.
Figure 3B:
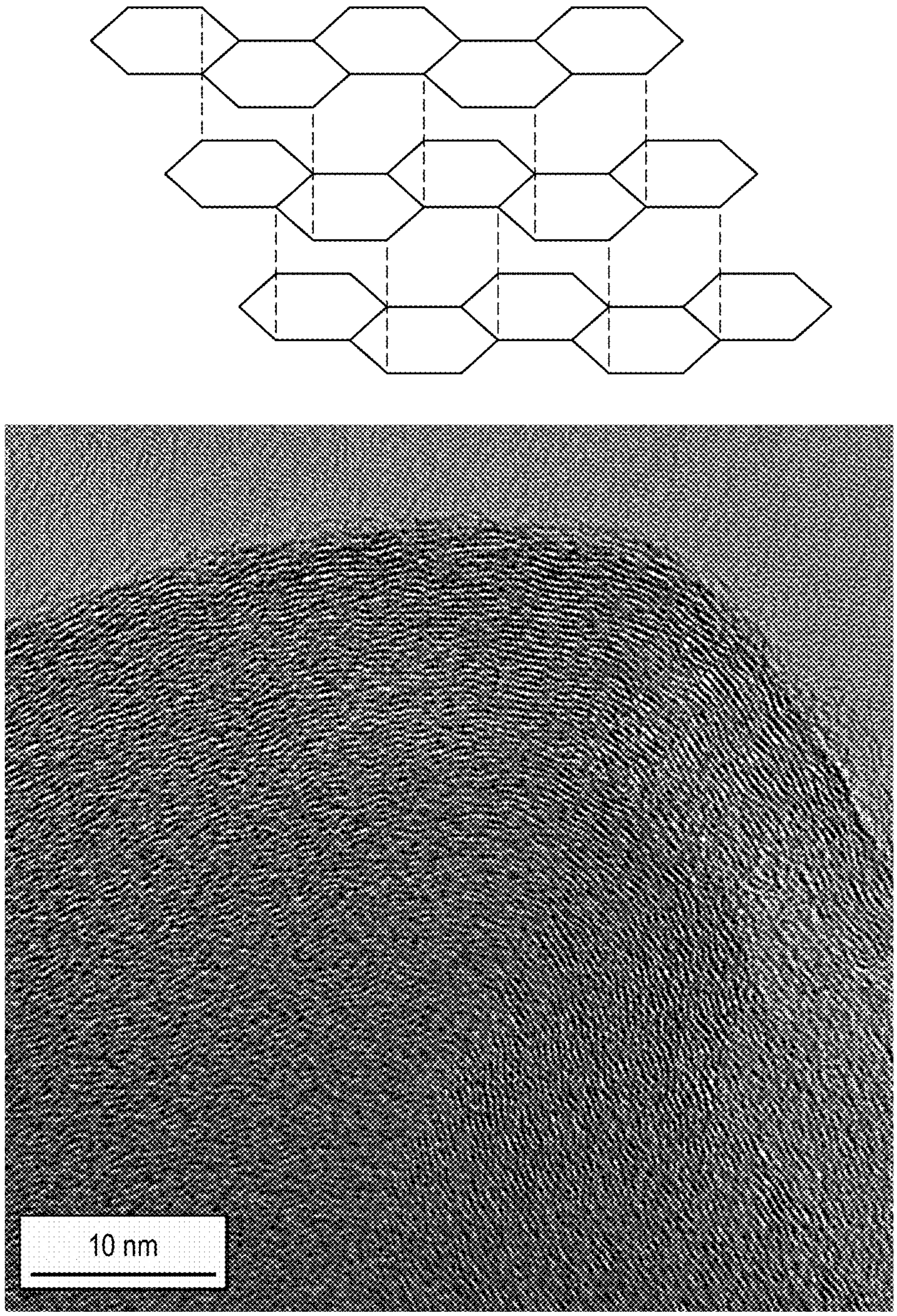
Figure 3C:
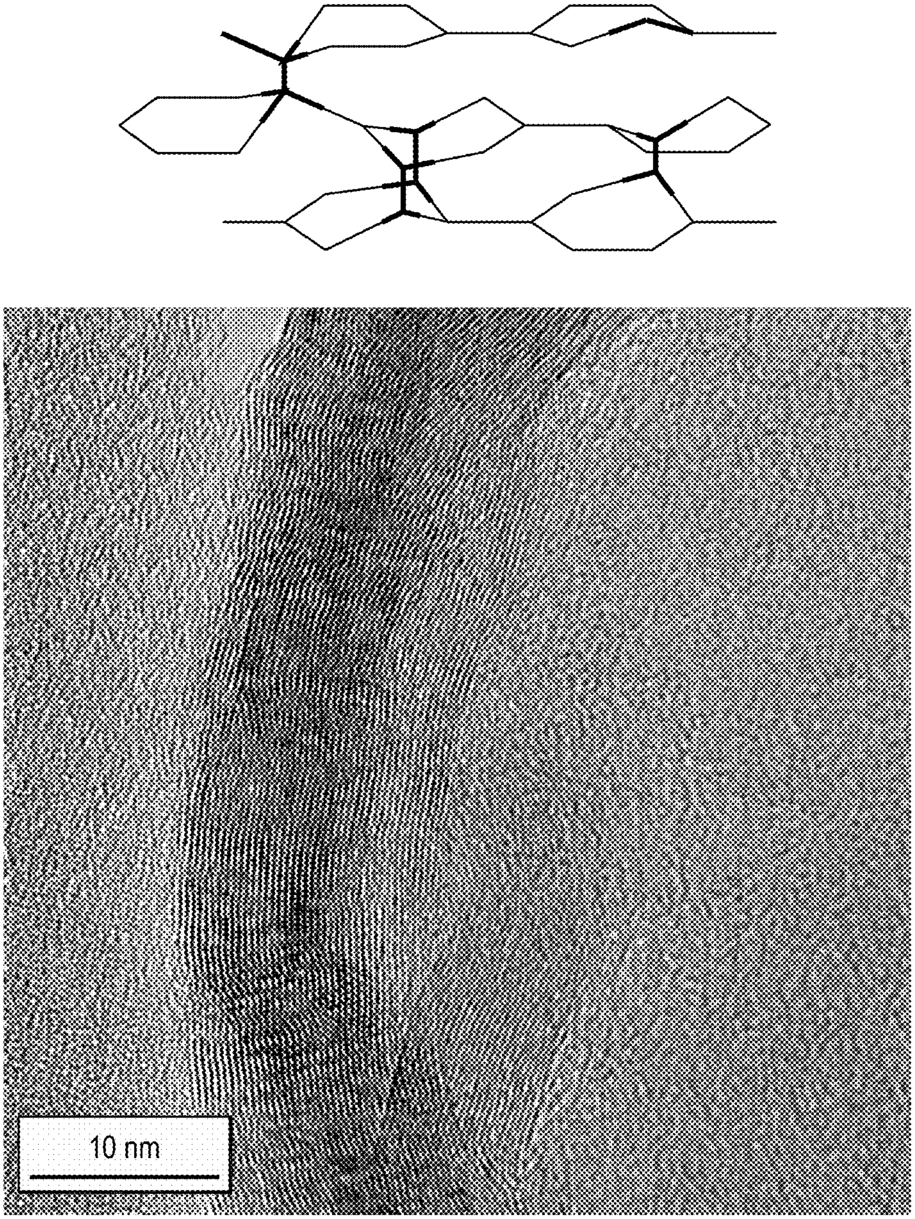
Figure 3D:
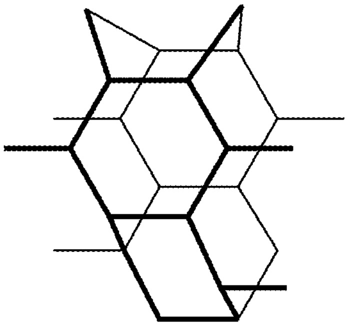
Figure 3D:
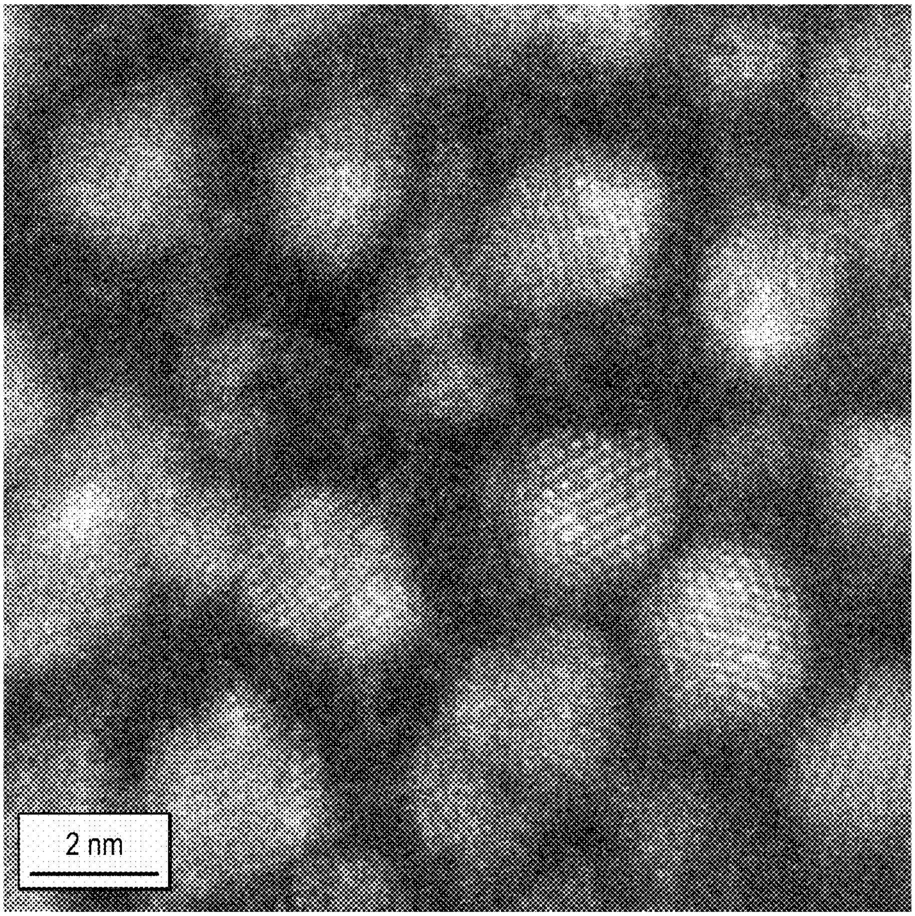
Figure 4A:
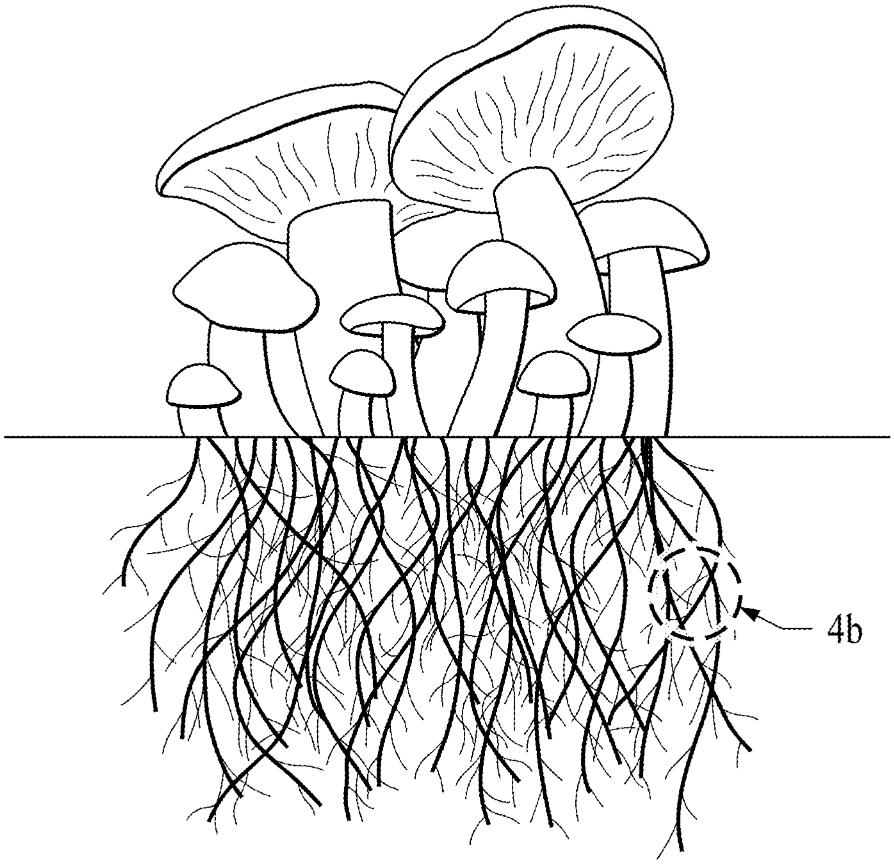
FIGS. 4*a*-4*h* are a graphical representation of the changes that occur during MPP of fungi.
Figure 4B:
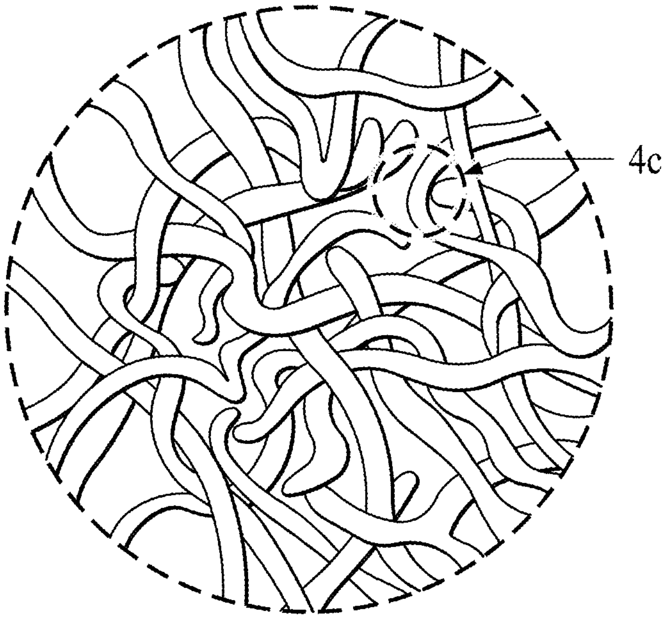
Figure 4C:
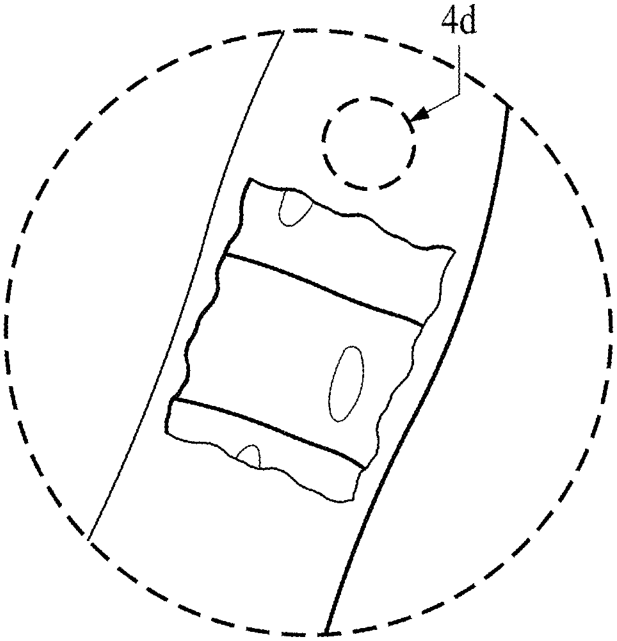
Figure 4D:
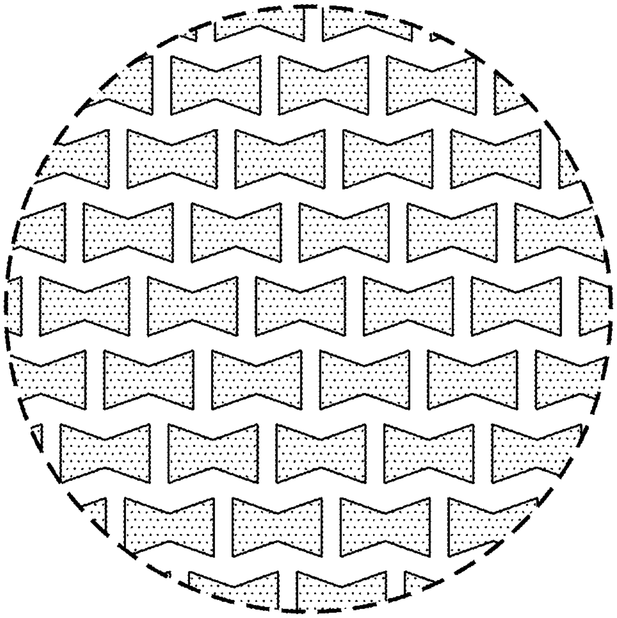
Figure 4E:
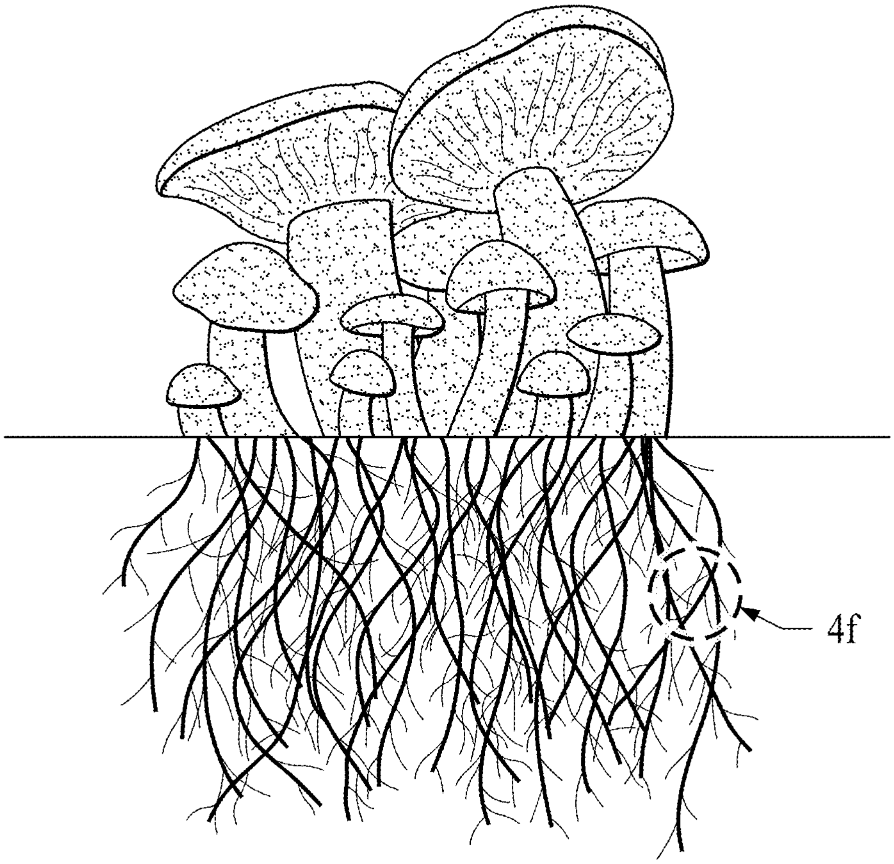
Figure 4F:
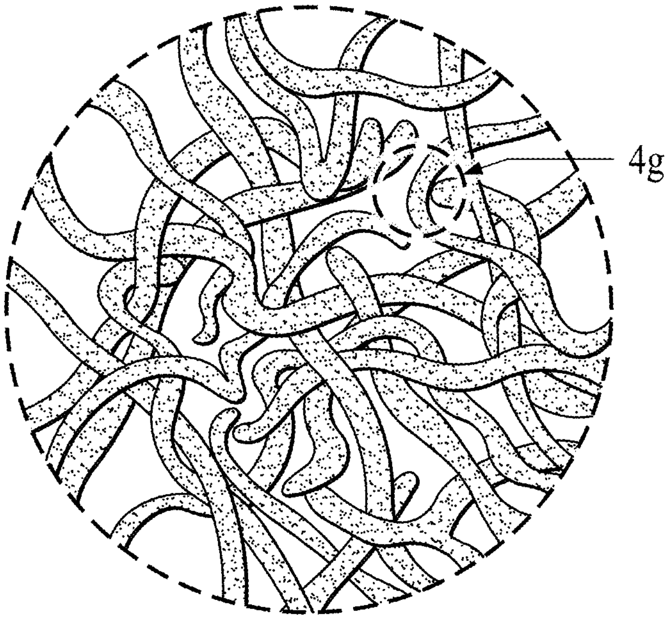
Figure 4G:
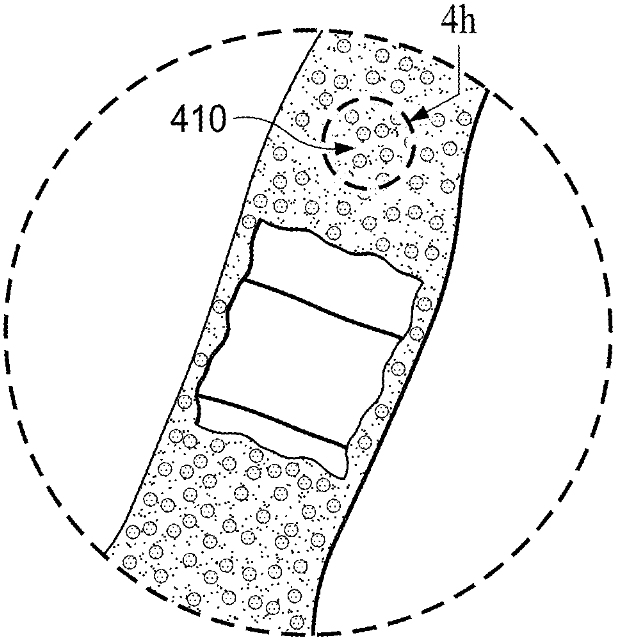
Figure 4H:
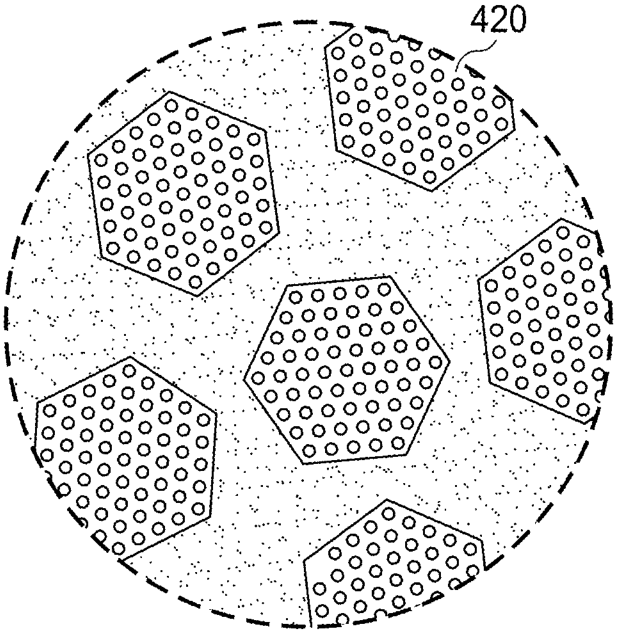

Referring to FIGS. 3*a*-3*d*, a series of TEM (transmitting electron microscopy) images are shown with accompanying depictions of the relevant carbon structures present during each stage of the proposed mechanism for UNCD (ultrananocrystalline diamond) formation during plasma pyrolysis. FIG. 3*a* shows the chitinous cell wall of an individual mycelium, or hyphae prior to processing. FIG. 3*b* is after charged ions bombard the chitinous cell wall of the mycelium during plasma pyrolysis, converting organic compounds to syngas and resin, with continued plasma bombardment and heating causing the chitin cellular walls to reduce to a graphitic phase. FIG. 3*c* shows mechanical stress from shrinkage, high temperature and plasma ion impacts causes the graphitic sheets to "pinch", and $sp^2$ graphitic bonds are converted to $sp^3$ diamond bonds. FIG. 3*d* is as the diamond seed continues growing, pulling in carbon atoms from the surrounding graphitic matrix.

Still referring to FIGS. 3*a*-3*d*, comparisons of mycelium imaged via HRTEM at different stages of the MPP process of converting mycelial chitin 310 into UNCD reveal the transformation of the chitin biomolecule into a crystalline phase resembling turbostratic carbon or graphitic sheets, likely as a transitional phase prior to UNCD nucleation. The HRTEM images shown in FIGS. 3a-3d were taken after different lengths of MPP processing (0 min for FIG. 3a, 5 min for FIGS. 3b, and 10 min for FIGS. 3c and 3d) and were selected to highlight the different stages of the transformation pathway of embodiments of this disclosure.

DISCUSSION

The conversion of chitin to graphitic and amorphous carbon phases has been investigated by numerous groups. Additionally, the metastability of diamond thin films and physics of transitions between graphitic layers has also been studied, simulated, and tested. Considering the high temperatures induced during the plasma pyrolysis process coupled with the chemical reactions of the gasses formed in the plasma (Ar, $CH_4$, $N_2$) and mechanical stresses being exerted upon the micron-sized mycelia structures during transformation, it follows that a transition from chitin to graphite to UNCD is a likely explanation for the presence of UNCD in the final product. A proposed UNCD formation pathway induced by the high temperature, localized pressures, and plasma chemical reactions endured during plasma pyrolysis is detailed in FIGS. 3a-3d, with a graphical representation of the overall MPP transformation of the fungal organism and its constituent mycelium shown in FIGS. 4a-4h.

Referring to FIGS. 4a-4h, graphical representations are shown of the changes that occur during MPP of fungi. The mycelium of the fungal body can be considered a filamentous root network (FIG. 4a), comprised of interconnected threads and tubes (FIG. 4b), with each thread/tube having a cellular structure for transport of water and minerals/nutrients (FIG. 4c), held together by a cellular wall comprised of chitin (FIG. 4d), a tough biopolymer. After plasma pyrolysis, the overall morphologies of the mycelium are preserved (FIGS. 4e and 4f), although with considerable shrinkage and weight loss. The chitinous cellular walls are converted into a graphitic matrix 410 (FIG. 4g) with dispersed diamond grains 420 (FIG. 4h) of average diameter small enough (3-5 nm on average) to be considered ultrananocrystalline diamond.

Figure 5A:
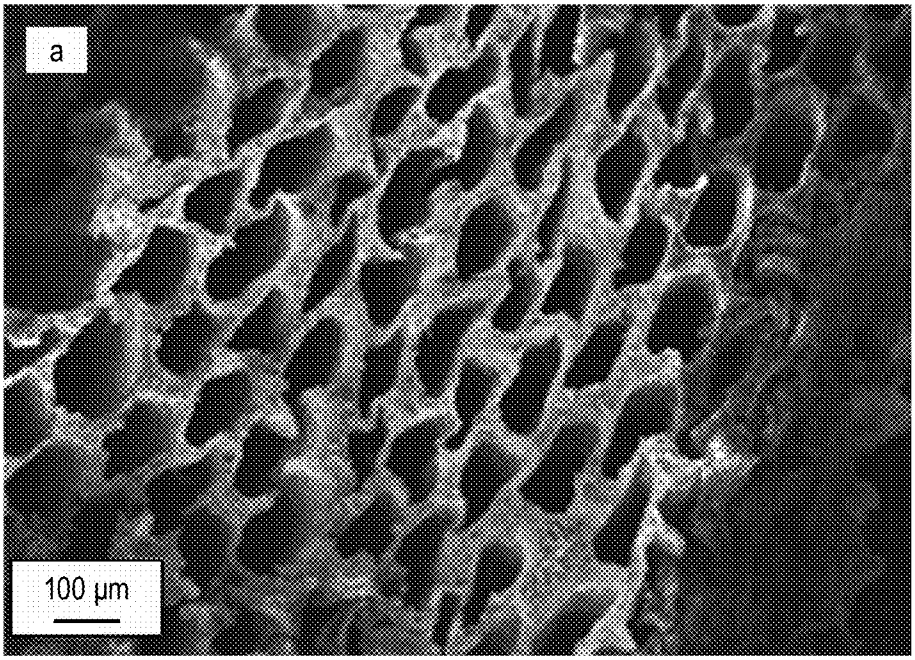
FIGS. 5*a*-5*f* are a series of images (a-d) showing hierarchical magnification of a mushroom's pore structures after MPP, showing preservation of features at the macroscale, microscale, and/or nanoscale.
Figure 5B:
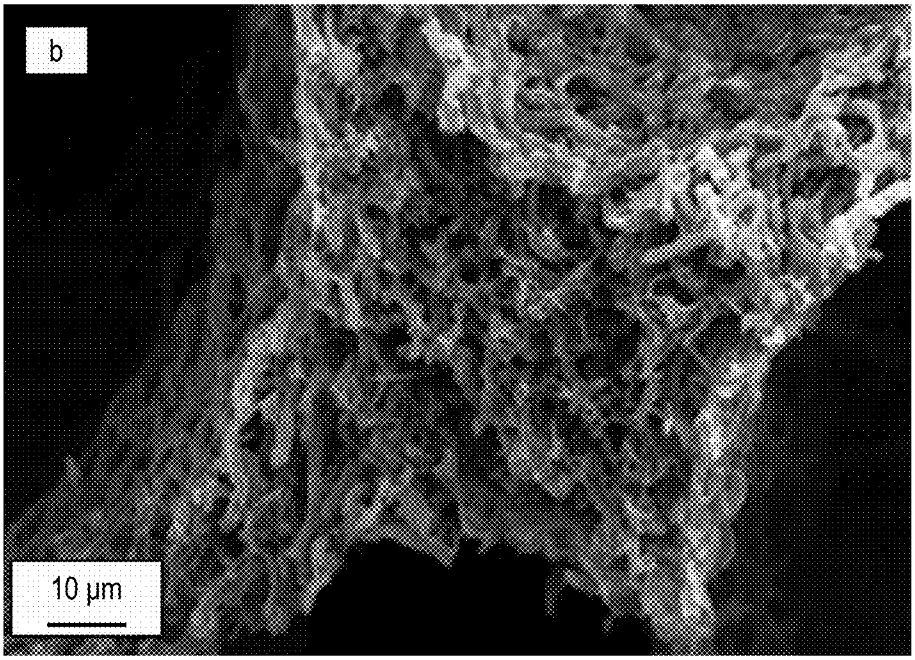
Figure 5C:
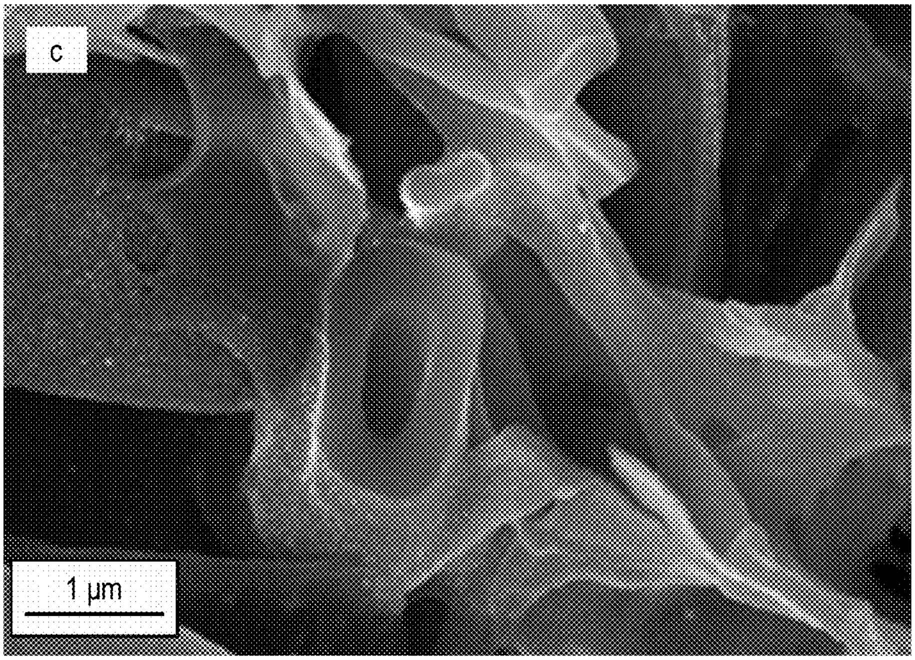
Figure 5D:
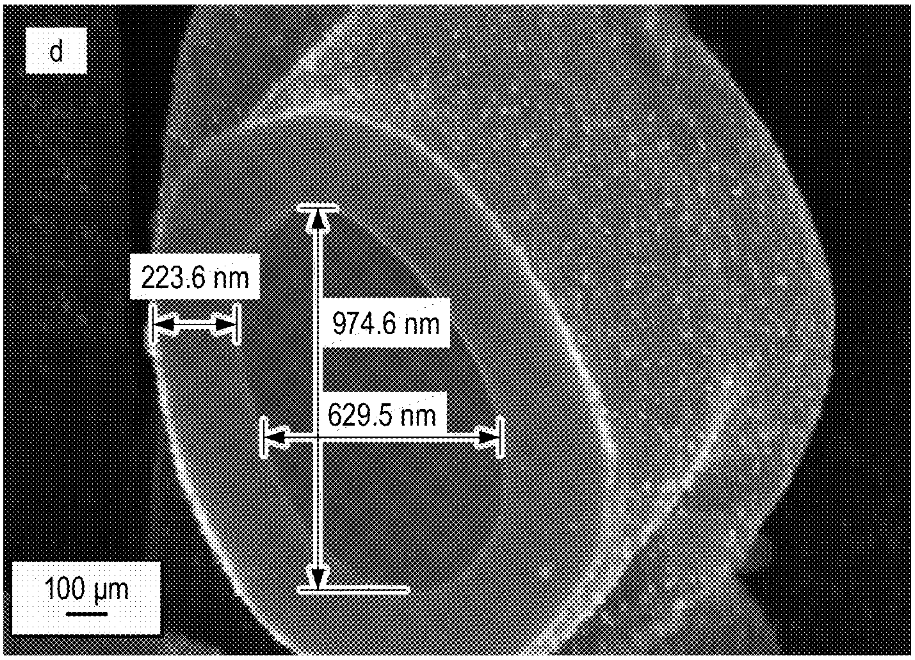
Figure 5E:
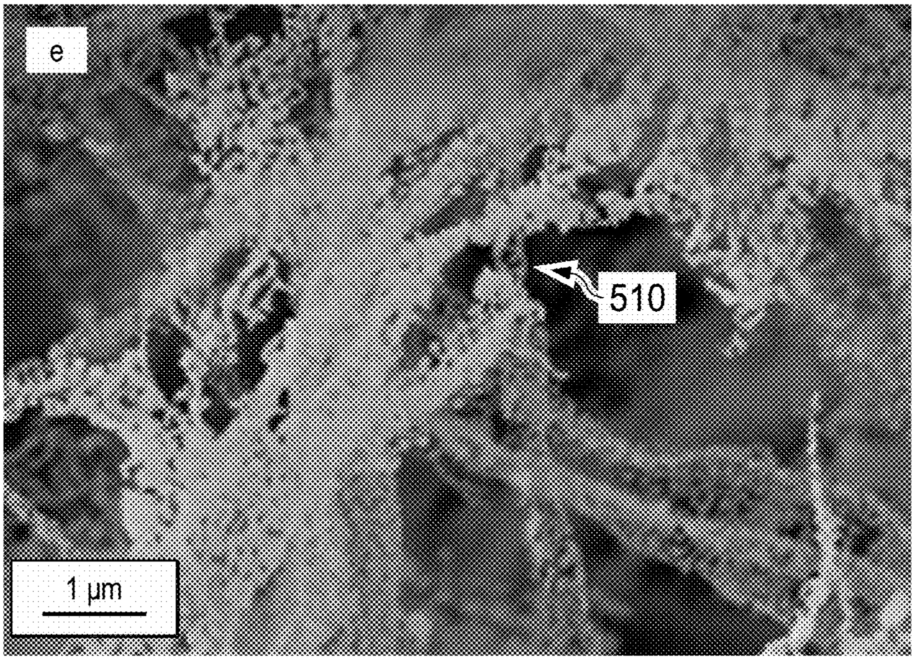
Figure 5F:
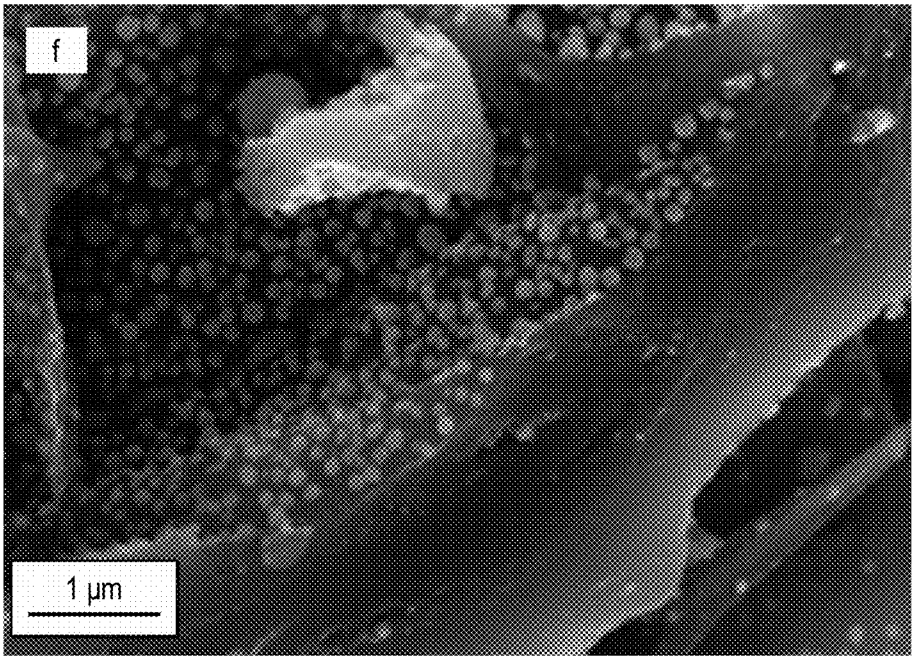

Referring to FIGS. 5a-5f, a series of images (FIGS. 5a-5d) depict hierarchical magnification of a mushroom's pore structures after MPP, showing preservation of features at the macroscale, microscale, and/or nanoscale. In FIG. 5d) the tube's sidewall thickness is measured at 223.6 nm, while the tube mouth dimensions are 974.6 nm high by 629.5 nm wide. In FIG. 5e, thread-like mycelia with thinner sidewalls undergo a radical transformation when processed with MPP, acquiring a unique skeleton-like appearance as the transitional graphitic phase is absorbed into the growing diamond crystals. In FIG. 5f, tube-like mycelia with thicker sidewalls instead show diamond formation and growth on the surface, with the bulk remaining in a graphitic phase.

In terms of physical characteristics, fungal mycelia can be broadly classified as thinner threads and thicker tubes. A possible explanation for the unique skeletal structures 510 shown in FIG. 5e is the chitinous walls of mycelial threads are thin enough that the resulting UNCD formation causes neighboring carbon atoms to get drawn into the diamond seed during growth. When the chitin walls are thicker, as found in mycelial tubes, the resulting graphitic structures may be more resistant to the diamond growth absorption and instead form isolated surface growths (FIG. 5f).

Of particular interest for future applications of UNCD-based myco-diamond is the preservation of natural microstructures formed during the self-directed growth of a mushroom, the reproductive fruiting body of the fungal organism. As seen in FIG. 5(a-d), in larger more robust fungal samples the self-assembled complex structures such as the pores and tubes survive the pyrolysis process. Despite the obvious complexity of the mushroom anatomy, all the structures are fundamentally assembled from the same chitinous mycelia, indicating that anything grown from a fungus or bound together by mycelia can be transformed via the MPP process and further functionalized with UNCD coatings via Microwave Plasma Chemical Vapor Deposition (MPCVD), as can nearly any other biologically derived nanocarbon with a graphitic or diamond-like surface chemistry. Myco-diamond samples have been tested and found to be easily compatible with the MPCVD diamond-coating process, including UNCD and nitrogen-doped nUNCD, leading to a variety of potential applications which will be explored further in future reports.

Fungi are renowned for growing organic structures boasting the largest surface area to volume ratio of nearly any other organism found in the natural world. Applications such as scaffolds for stem cell growth and differentiation, air filters, gas or liquid filters, desalination membranes, and energy storage electrodes (e.g., batteries and supercapacitors) can benefit from this natural feature, potentially opening up a new field of biofabrication with mycelial structures being grown to specification to meet application requirements. Given the possibilities for improvements possible through genetic engineering, species selection, growth environment optimization, and mycelial orientation via electrical fields, the possibilities for fungal-based bionanomaterials are significant and merit further investigation.

CONCLUSIONS

The presence of ultrananocrystalline diamond in fungal mycelium exposed to microwave plasma pyrolysis is confirmed via complimentary techniques including Raman spectroscopy, HRTEM and XRD. Although a single fungal species is utilized in this report, comparable results from the MPP process were found across several species of fungi with the commonality of being composed of mycelia with chitinous cellular walls. A possible mechanism for the conversion of chitin into UNCD is proposed, including a graphitic intermediary phase. Potential applications based on UNCD myco-diamond nanostructures are discussed, with possible routes towards product improvements. From a broader perspective, the MPP process and resulting myco-diamond structures represents a sustainable, scalable and economical method for production of diamond and diamond-like nanocarbons from biological sources.

Methods

Fungal Sample Collection

Figure 6A:
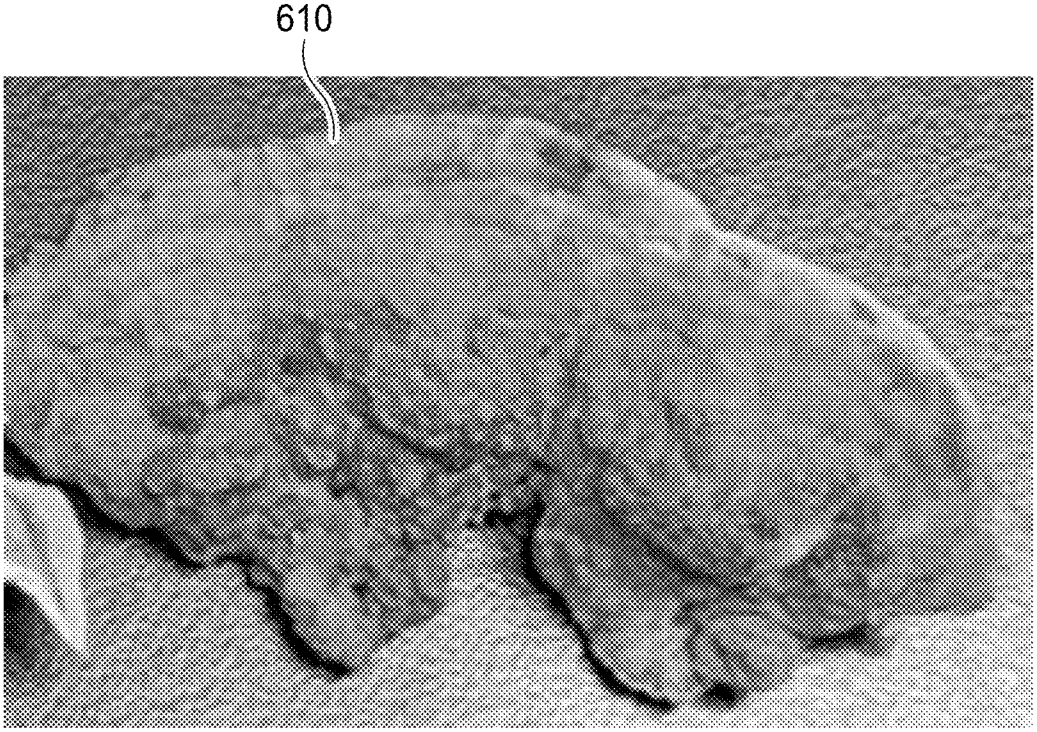
FIGS. 6*a*-6*b* are pictures of a) a mushroom sample used in this report, identified as Phillenus linteus, locally harvested and b) the after several minutes of MPP exposure.
Figure 6B:

Referring to FIGS. 6a-6b, pictures are shown of FIG. 6a) a mushroom sample 610 used in this report, identified as Phillenus linteus, locally harvested and FIG. 6b) after several minutes of MPP exposure. Fungal mushroom samples growing naturally around the Dallas environment were collected by hand and brought to the lab. Preference was given to fungal species growing on logs and dead trees as they yielded specimens large and robust enough to provide useful sample. The species investigated was identified as Phillenus linteus (FIGS. 6a-6b), although several other species were collected and tested with similar results which will be reported in future publications.

Microwave Plasma Pyrolysis Setup

Figure 7:
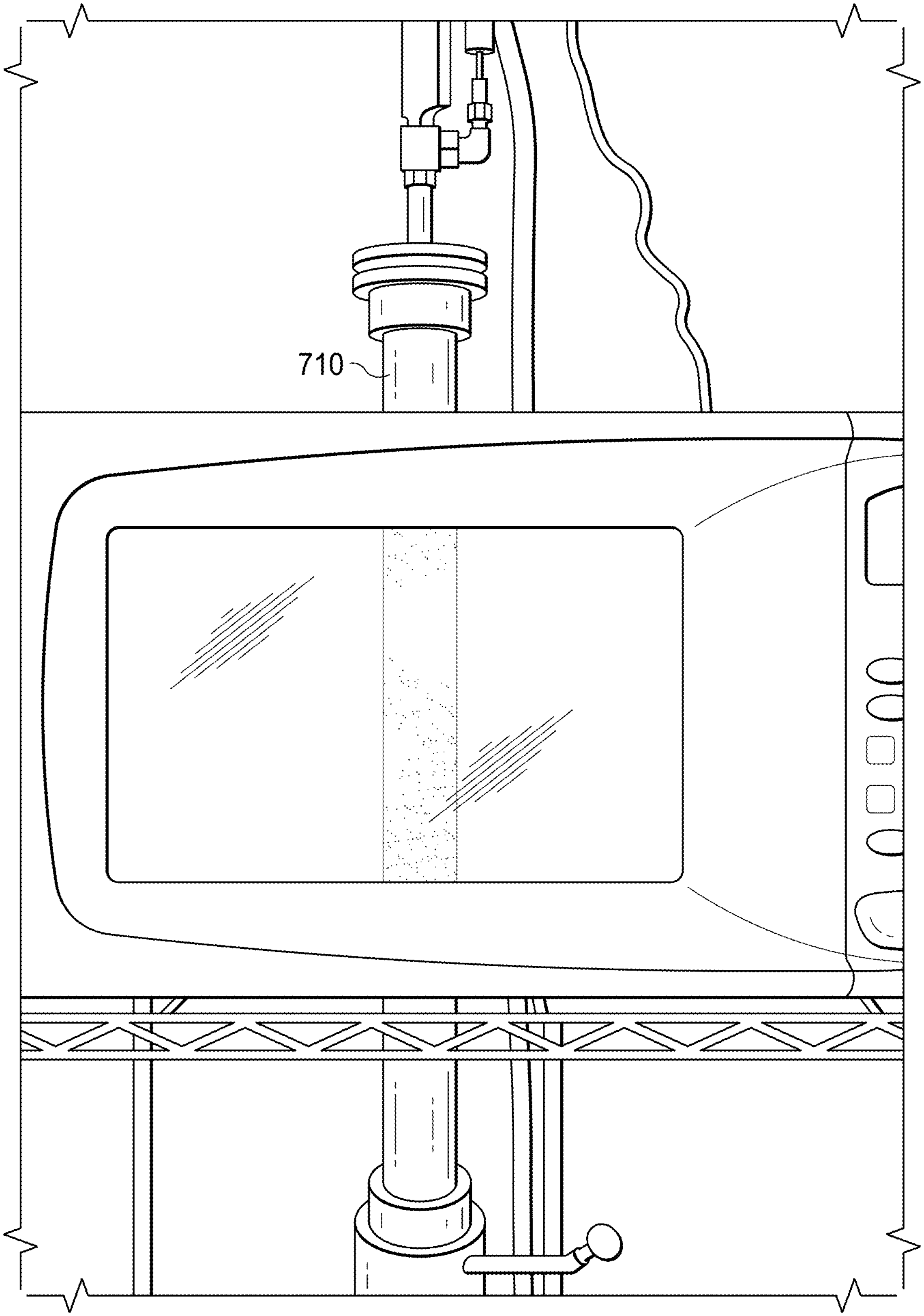
FIG. 7 illustrates a microwave plasma reaction tube assembly with ignited plasma. Argon carrier gas introduced through the bottom port and pumped out through the top port.

Referring to FIG. 7, a microwave plasma reaction tube assembly with ignited plasma is shown. Argon carrier gas is introduced through the bottom port and pumped out through the top port. Due to the amount of residue generated during the pyrolysis process and to prevent contamination and fouling of existing systems, a custom plasma reactor was constructed utilizing a standard 990-watt kitchen microwave oven as a microwave source. The design includes a quartz furnace tube 710 mounted vertically through the center of the oven, with both ends capped with stainless steel vacuum fittings. The top cap was connected to a vacuum roughing pump and pressure gauge, while the bottom cap was connected to an Argon gas supply and flow regulator.

Prior to operation, the reactor was pumped below 1 Torr of pressure, then backfilled with a constant flow of Argon gas to an average pressure of 3-4 Torr. Alternatively, the argon can be replaced with nitrogen or other gases. Through experimentation it was found that the evolution of gaseous byproducts and resins during pyrolysis of larger samples could dampen or quench plasma activity. This issue can be mitigated by utilizing the built-in power settings of the microwave's interface, which do not necessarily change the applied power from the magnetron but instead control its on/off time, thereby allowing for the removal of evolved gasses prior to plasma reignition. This technique is necessary for pyrolyzing larger samples, due to the limitations imposed by the 2" diameter of the quartz furnace tube and the pumping capacity of the roughing pump. Samples processed in this report were cut small enough to allow for continuous plasma pyrolysis without generating enough residue to block the microwave energy during each run. A system upgrade is planned for adding a cold trap for capture and removal of resins from the exhaust flow.

Figure 8:
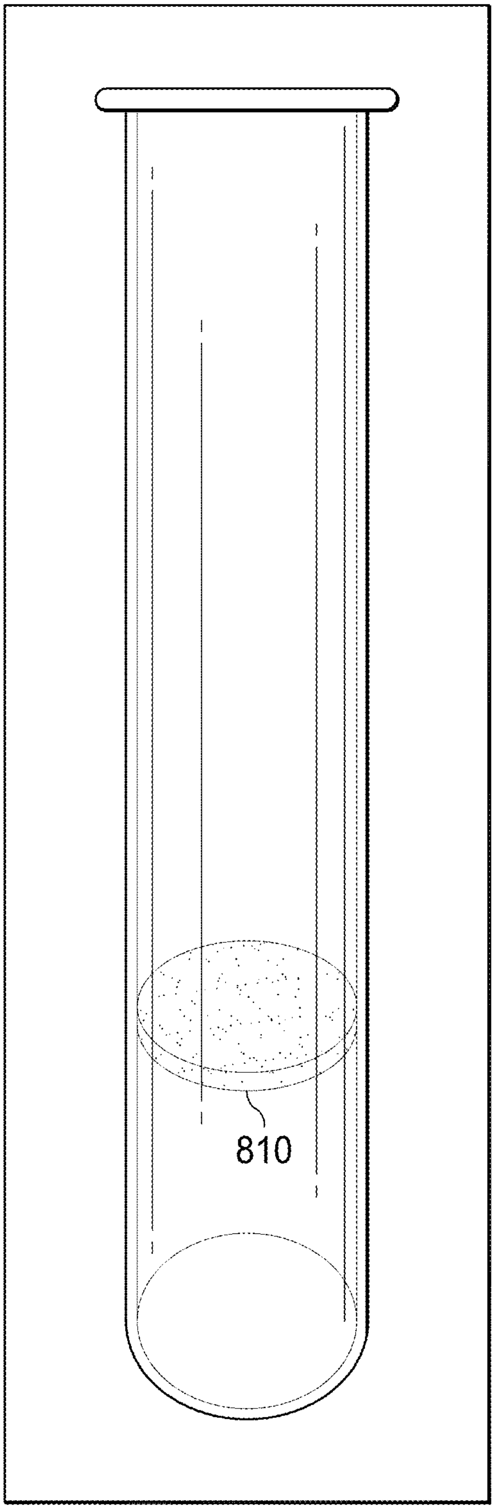
FIG. 8 is a picture of a quartz tube insert with fritted quartz disc used for supporting samples during the MPP process.

Referring to FIG. 8, a picture is shown of a quartz tube insert 810 with fritted quartz disc used for supporting samples during the MPP process. To facilitate the mounting and removal of samples at the ideal reaction zone (microwave oven cavities are generally designed to focus energy on a plate of food in the bottom center of the cavity), a quartz tube insert slightly narrower than the inner diameter of the furnace tube was fabricated by Technical Glass Products (Painesville, OH). Seen in FIG. 8, the quartz tube includes a flanged lip with a fritted quartz disc welded at the ideal sample mounting height, to diffuse the flow of gas evenly around the sample. Resin residue could be "ashed" or cleaned off the sidewalls of the quartz reactor tube by running the plasma with air instead of Argon.

Although no chemical sensors were utilized in this setup, the evolution of the plasma reaction and the pyrolysis process can be estimated from the changing color of the plasma, such that the carbonization process is considered complete when the color of the plasma remains stable. It was found that complete pyrolysis was generally finished within 4-5 minutes, depending on the size of the sample. Plasma color observed at the start of the process was blue, characteristic of an oxygen-rich plasma, then shifting to pink, characteristic of a nitrogen-rich plasma, for the duration of the process.

Characterization

Surface morphology was investigated using a Zeiss SUPRA 40 SEM, operating with an accelerating voltage of 10-15 kV and an imaging resolution of 1.2 nm. Samples were mounted on double-sided copper tape and adhered directly to the stub. No further processing or conductive coatings were required.

TEM imaging was performed with a JEOL JEM-ARM 200F Atomic Resolution Analytical Microscope system equipped with aberration correction and a ZnO/W(100) Shottky emitter field emission gun (FEG), operating at 200 kV. An unprocessed fungal sample was prepared by freezing in liquid nitrogen followed immediately crushing it into a fine powder with mortar and pestle. This powder was then drop cast on a 200 mesh Cu grid. In order to get a representative sample and to minimize potential contamination a unique methodology was developed for preparing pyrolyzed samples for TEM analysis. A small amount of the sample was mounted on a strip of conductive carbon tape, which was then loaded into a FEI Nova 200 FIB chamber along with a standard Cu lift-out grid. The sample was surveyed with the electron beam at 5 kV to find a suitable fiber in an ideal orientation and position, then the Omniprobe was inserted and carefully brought into contact with the fiber. The ion beam was operated at 30 k V and 30 pA to minimize sample damage. It was found that the fibers naturally stuck to the Omniprobe when brought into close proximity, and contact could be determined by slight changes in contrast. In a manner similar to typical lift-out procedures a small Pt weld spot was deposited to affix the fiber to the Omniprobe. The base of the fiber was then cut using the ion beam, and the fiber sample removed and transferred into position above the lift-out grid. The probe could then be rotated and maneuvered into position and one or both ends anchored on the grid with Pt spot welds. The probe tip was then freed by ion milling of the weld spot. While this technique does not eliminate the potential for Pt contamination, it does limit it to the areas required for bonding, especially compared to the standard lift-out procedure. Furthermore, this technique allows the predominantly carbon sample to be imaged without a lacey carbon backing or deep Pt ion penetration, removing potential sources of error or confusion. Bright/dark field images and electron diffraction patterns were collected using a Gatan camera detector, and further processed using the Gatan software suite. Obtaining publication-worthy electron diffraction patterns proved quite problematic, due to the diamond grains being surrounded by graphitic and amorphous carbon phases which are impossible to remove or clean. Image analysis of crystal atomic spacing is provided in FIGS. 9*a*-9*b* as an alternative means of verification.

Figure 9A:
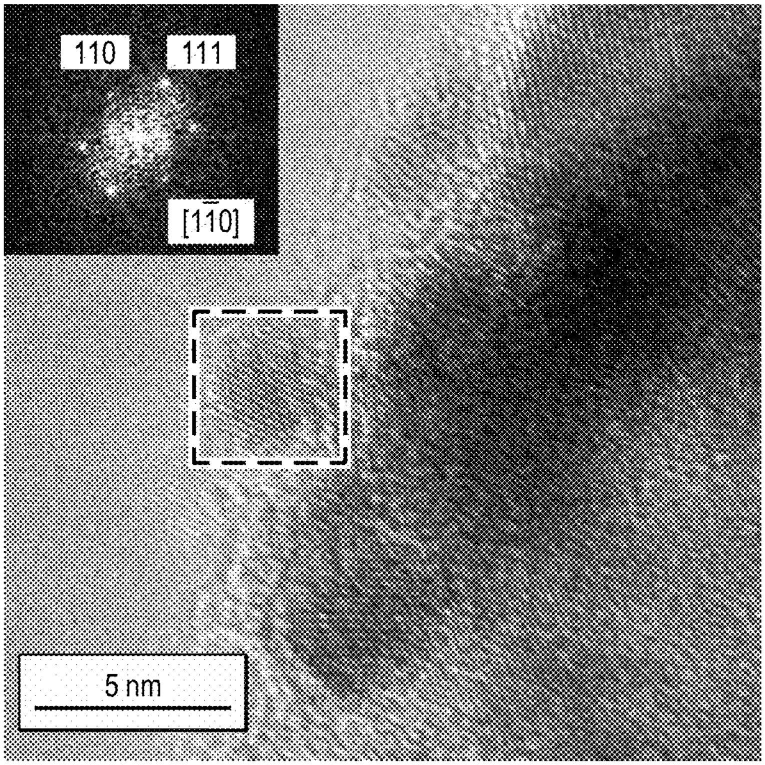
FIGS. 9*a*-9*b* are TEM images of portions of a myco-diamond containing sample prepared via FIB single-fiber lift-out.
Figure 9B:
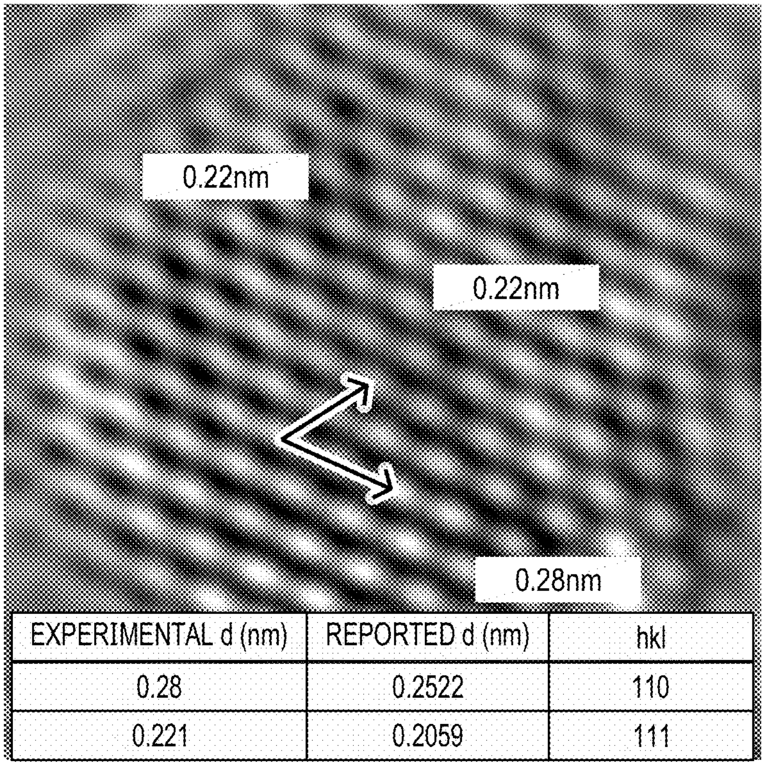

Referring to FIGS. 9*a*-9*b*, TEM images are shown of portions of a myco-diamond containing sample 910 prepared via FIB single-fiber lift-out. Analysis of the TEM images of myco-diamond containing sample prepared via FIB single-fiber lift-out shows atomic spacing as measured and compared with reported values.

X-Ray Diffraction analysis was performed using a Rigaku SmartLab XRD with a Cu Kα source operating in the bulk sample analysis mode. Samples were placed directly on the platen without further preparation, with height adjustments controlled via software to maximize signal transmission and minimize background peak intensity.

Raman chemical analysis was performed using a ThermoScientific DXR Raman microscope running Omnic ver.9.2.98 with a 532 nm laser wavelength at 8 mW laser power with a grating of 900 lines/mm. Scanning range was set from 30 to 3574 $cm^{-1}$ with a spot size of 2.1 μm and a resolution between 2.7 to 4.2 $cm^{-1}$.

The descriptions of the various embodiments of the present invention have been presented for purposes of illustration, but are not intended to be exhaustive or limited to the embodiments disclosed or claimed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The term biomaterial is intended to mean a material including biomass or organic fibers. The phrase microwave plasma pyrolysis is intended to mean delivery of microwave energy to a low pressure (less than approximately 10 Torr) gaseous environment of argon gas with residual atmospheric $N_2$ and $O_2$. At this lower pressure, the microwave (MW) power induces the formation of a plasma containing $Ar^+$, $N^+$, $O^+$ ions, neutral atoms, and free electrons, which act upon a biomass (e.g. mushrooms, mycelium and/or chitin) and induce physical and chemical transformations. Additional influence from the gasses (such as syngas) evolved during pyrolysis and their role in the evolving plasma may play a role in the overall transformation of chitin into myco-diamond. The phrase myco-diamond matrix is intended to mean ultrananocrystalline diamond (UNCD) characterized by grain diameters of from approximately 2 nm to approximately 5 nm, in pyrolzed biomass with macro, micro, and/or nanoscale features. The phrase nanostructured material is intended to mean a physical substance having one or more features that are characterized by one or more dimensions less than 1 micron.

The term uniformly is intended to mean unvarying or deviating very little from a given and/or expected value (e.g. within 5% of). The term substantially is intended to mean largely but not necessarily wholly that which is specified (e.g. at least 95%). The term approximately is intended to mean at least close to a given value (e.g., within 5% of). The term generally is intended to mean at least approaching a given state (e.g. at least 90%). The term coupled is intended to mean connected, although not necessarily directly, and not necessarily mechanically. The term proximate, as used herein, is intended to mean close, near adjacent and/or coincident; and includes spatial situations where specified functions and/or results (if any) can be carried out and/or achieved. The term distal, as used herein, is intended to mean far, away, spaced apart from and/or non-coincident, and includes spatial situation where specified functions and/or results (if any) can be carried out and/or achieved. The term deploying is intended to mean designing, building, shipping, installing and/or operating.

Unless otherwise defined, all technical and scientific terms used herein have the same meaning as commonly understood by one of ordinary skill in the art to which this present disclosure belongs. In case of conflict, the present specification, including definitions, will control.

The described embodiments and examples are illustrative only and not intended to be limiting. Although embodiments of the present disclosure can be implemented separately, embodiments of the present disclosure may be integrated into the system(s) with which they are associated. All the embodiments of the present disclosure disclosed herein can be made and used without undue experimentation in light of the disclosure. Embodiments of the present disclosure are not limited by theoretical statements (if any) recited herein. The individual steps of embodiments of the present disclosure need not be performed in the disclosed manner, or combined in the disclosed sequences, but may be performed in any and all manner and/or combined in any and all sequences. The individual components of embodiments of the present disclosure need not be formed in the disclosed shapes, or combined in the disclosed configurations, but could be provided in any and all shapes, and/or combined in any and all configurations. The individual components need not be fabricated from the disclosed materials, but could be fabricated from any and all suitable materials. Homologous replacements may be substituted for the substances described herein. Agents which are chemically related may be substituted for the agents described herein where the same or similar results would be achieved.

Various substitutions, modifications, additions and/or rearrangements of the features of embodiments of the present disclosure may be made without deviating from the scope of the underlying inventive concept. All the disclosed elements and features of each disclosed embodiment can be combined with, or substituted for, the disclosed elements and features of every other disclosed embodiment except where such elements or features are mutually exclusive. The scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" or "mechanism for" or "step for". Sub-generic embodiments of this disclosure are delineated by the appended independent claims and their equivalents. Specific embodiments of this disclosure are differentiated by the appended dependent claims and their equivalents.

What is claimed is:

1. A method of processing biomaterial, comprising:

providing a source of chitin; and pyrolyzing at least a portion of the source of chitin using a microwave plasma, wherein pyrolyzing comprises producing a nanostructured carbon material comprising at least one of diamond, ultrananocrystalline diamond, graphite, and graphene.

2. The method of claim 1, wherein pyrolyzing at least a portion of the source of chitin comprises transforming chitinous biochemical bonds to carbon $sp^2/sp^3$ bonds.

3. The method of claim 2, wherein pyrolyzing at least a portion of the source of chitin comprises converting carbon $sp^2$ graphitic bonds to carbon $sp^3$ diamond bonds.

4. The method of claim 1, wherein the microwave plasma is formed in a reactor chamber having a process base pressure of less than 100 Tor, and an internal volume containing at least one non-oxygen process gas.

5. The method of claim 4, wherein the process base pressure is less than 10 Torr.

6. The method of claim 4, wherein the at least one non-oxygen process gas comprises argon, wherein the internal volume is substantially free of oxygen such that the at least a portion of the source of chitin is not oxidized or ashed during pyrolyzing at least a portion of the source of chitin.

7. The method of claim 6, wherein the internal volume contains a non-oxygen process gas other than argon.

8. The method of claim 1, wherein the source of chitin is derived from mycelia.

9. The method of claim 8, wherein the source of chitin is derived from chitinous cellular walls.

10. The method of claim 8, further comprising providing a source of lignin and cellulose and pyrolyzing at least a portion of the source of lignin and cellulose using the microwave plasma.

11. The method of claim 1, further comprising growing the source of chitin on a fabric substrate before pyrolizing at least the portion of the source of chitin using the microwave plasma.

12. The method of claim 11, wherein the fabric substrate comprises non-woven fibers.

13. The method of claim 11, wherein the fabric substrate comprises woven fibers.

14. The method of claim 11, wherein the fabric substrate comprises at least one of hemp and bamboo.

* * * * *